(12) United States Patent
Rutherford et al.

(10) Patent No.: US 8,235,762 B2
(45) Date of Patent: Aug. 7, 2012

(54) MOUNTING ARRANGEMENT FOR SQUEAKER

(75) Inventors: Ryan Rutherford, Belleville, NJ (US); Jonathan Willinger, Tenafly, NJ (US)

(73) Assignee: J.W. Pet Company, Inc., Teterboro, NJ (US)

( * ) Notice: Subject to any disclaimer, the term of this patent is extended or adjusted under 35 U.S.C. 154(b) by 293 days.

(21) Appl. No.: 12/540,783

(22) Filed: Aug. 13, 2009

(65) Prior Publication Data

US 2010/0041302 A1    Feb. 18, 2010

Related U.S. Application Data

(63) Continuation-in-part of application No. 11/937,631, filed on Nov. 9, 2007, now Pat. No. 7,833,079, and a continuation-in-part of application No. 11/312,244, filed on Dec. 20, 2005, now Pat. No. 7,736,213, and a continuation-in-part of application No. 11/312,071, filed on Dec. 20, 2005, now Pat. No. 7,736,212.

(60) Provisional application No. 61/183,652, filed on Jun. 3, 2006, provisional application No. 61/100,303, filed on Sep. 26, 2008, provisional application No. 61/088,500, filed on Aug. 13, 2008.

(51) Int. Cl.
    *A63H 3/28* (2006.01)
(52) U.S. Cl. ........................................ 446/184; 119/707
(58) Field of Classification Search .................. 119/707, 119/709, 711; 446/183, 184, 188
    See application file for complete search history.

(56) References Cited

U.S. PATENT DOCUMENTS

| | | | |
|---|---|---|---|
| 754,148 | A | 3/1904 | Kuhlemann |
| 1,187,838 | A | 6/1916 | Hughes |
| 1,612,651 | A | 12/1926 | Thomas |
| 1,668,785 | A | 5/1928 | Smart |
| 2,631,407 | A | 3/1953 | Rempel |
| 2,714,275 | A | 8/1955 | Proll |
| 2,734,309 | A | 2/1956 | Seaver |
| 2,745,214 | A | 5/1956 | Lawson |
| 2,763,960 | A | 9/1956 | Wintriss |
| 2,777,252 | A | 1/1957 | Tancredi et al. |

(Continued)

OTHER PUBLICATIONS

Bowzer Ball images taken on May 13, 2008, copyright statement on label indicating copyright date of 2006.

(Continued)

*Primary Examiner* — John Ricci

(74) *Attorney, Agent, or Firm* — Katten Muchin Rosenman LLP

(57) ABSTRACT

A method of making a noise producing toy includes the steps of providing a noise producing assembly; providing or molding a first body portion having a first material and having an aperture, the first material having a material that is conducive mounting of the noise producing assembly into the aperture; mounting the first body portion on a mandrel of a mold core, the mold core for forming at least part of a body of the noise producing toy; molding a second body portion to engage the first body portion on a mold core to form at least part of the body, separating the mandrel and mold core and the at least part toy body; mounting the noise producing assembly into the aperture.

23 Claims, 19 Drawing Sheets

U.S. PATENT DOCUMENTS

| | | | |
|---|---|---|---|
| 2,817,116 | A | 12/1957 | Miller et al. |
| 2,975,550 | A | 3/1961 | Miller |
| 3,075,317 | A | 1/1963 | Craft |
| 3,702,038 | A | 11/1972 | Hakim |
| 3,956,850 | A | 5/1976 | Seidenberg |
| RE29,050 | E | 11/1976 | Hakim |
| 4,253,254 | A | 3/1981 | Gill |
| 4,380,134 | A | 4/1983 | Taluba et al. |
| 4,506,468 | A | 3/1985 | Willhite |
| 4,779,344 | A | 10/1988 | Panisch |
| 5,113,784 | A | 5/1992 | Forselius |
| 5,267,885 | A | 12/1993 | Niskern et al. |
| 2,712,201 | A | 7/1995 | Wintriss |
| 6,112,703 | A | 9/2000 | Handelsman |
| 6,216,640 | B1 | 4/2001 | Zelinger |
| 6,413,139 | B1 | 7/2002 | Douglas |
| 6,609,944 | B1 | 8/2003 | Viola |
| 6,881,120 | B1 | 4/2005 | Janes |
| 6,935,274 | B1 | 8/2005 | Rothschild |
| 7,066,779 | B2 | 6/2006 | Willinger |
| 7,201,117 | B2 | 4/2007 | Ritchey |
| 7,343,878 | B2 | 3/2008 | Ritchey |
| 2001/0008125 | A1 | 7/2001 | Mann |
| 2002/0102912 | A1 | 8/2002 | Duval |
| 2007/0245976 | A1 | 10/2007 | Ritchey |

OTHER PUBLICATIONS

Non-final Office Action dated Jul. 20, 2009, from corresponding U.S. Appl. No. 11/937,631.
Non-final Office Action dated Dec. 31, 2007 from corresponding U.S. Appl. No. 11/312,244.
Final Office Action dated Sep. 8, 2008 from corresponding U.S. Appl. No. 11/312,244.
Final Office Action dated May 27, 2009 from corresponding U.S. Appl. No. 11/312,244.
Non-final Office Action dated Aug. 12, 2009 from corresponding U.S. Appl. No. 11/312,244.
Non-final Office Action dated Dec. 31, 2007 from corresponding U.S. Appl. No. 11/312,071.
Final Office Action dated Sep. 2, 2009 from corresponding U.S. Appl. No. 11/312,071.
Non-final Office Action dated Dec. 13, 2004 from corresponding U.S. Appl. No. 10/889,962.
Final Office Action dated Sep. 9, 2008 from corresponding U.S. Appl. No. 11/312,071.
Non-final Office Action dated Dec. 30, 2008, from corresponding U.S. Appl. No. 11/312,071.
Non-final Office Action dated Feb. 18, 2009 from corresponding U.S. Appl. No. 11/312,244.

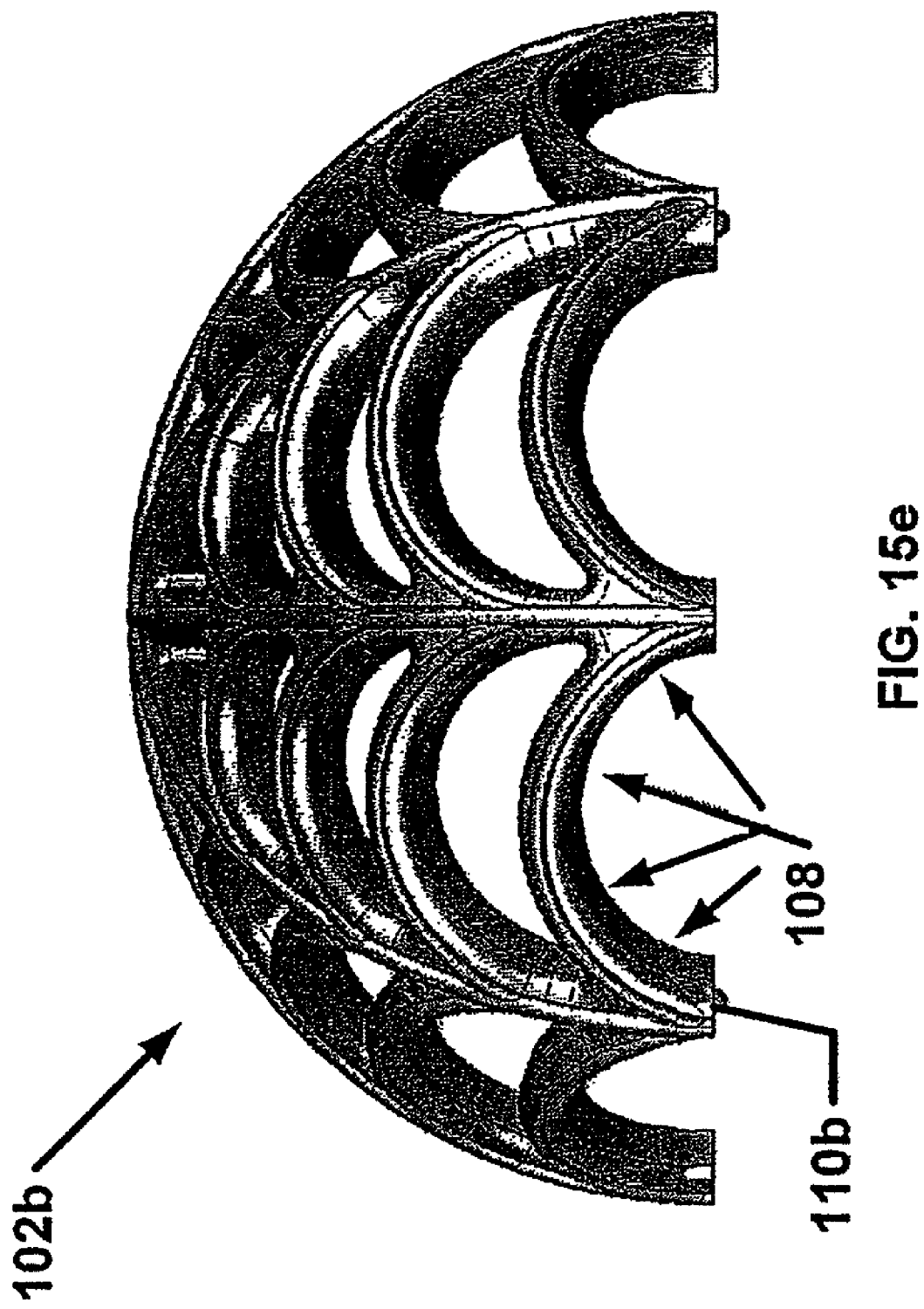

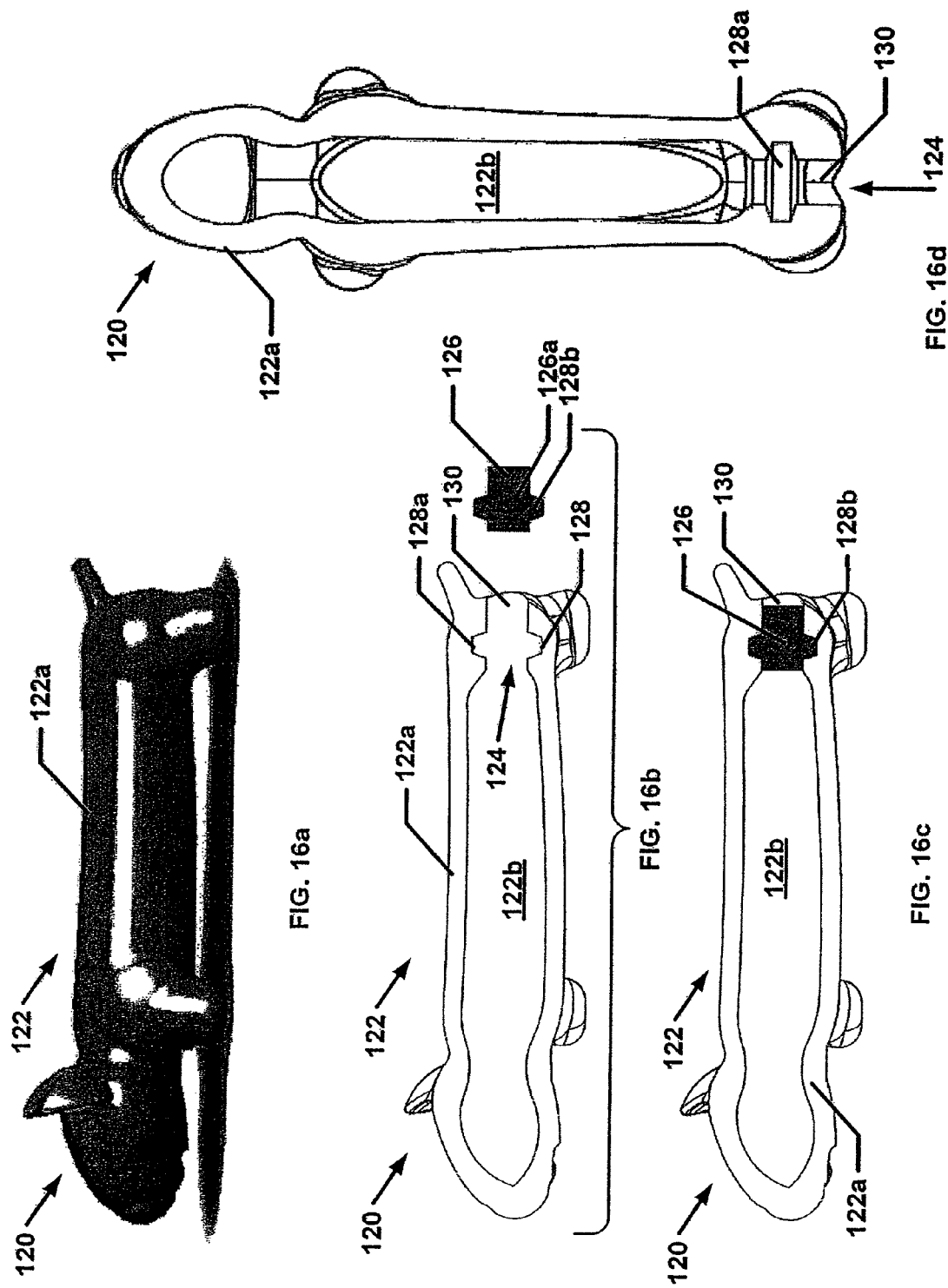

MOUNTING ARRANGEMENT FOR SQUEAKER

CROSS-REFERENCE TO RELATED APPLICATIONS

This application is a non-provisional counterpart to and claims priority to U.S. Ser. No. 61/183,652 filed Jun. 3, 2009, which is and which is herein incorporated by reference in its entirety for all purposes.

This application is a non-provisional counterpart to and claims priority to U.S. Ser. No. 61/100,303 filed Sep. 26, 2008, which is and which is herein incorporated by reference in its entirety for all purposes.

This application is a non-provisional counterpart to and claims priority to U.S. Ser. No. 61/088,500 filed Aug. 13, 2008, which is and which is herein incorporated by reference in its entirety for all purposes.

This application is a continuation-in-part application and claims priority to U.S. Ser. No. 11/937,631 filed Nov. 9, 2007, which is and which is herein incorporated by reference in its entirety for all purposes.

This application is a continuation-in-part application and claims priority to U.S. Ser. No. 11/312,244 filed Dec. 20, 2005, which is and which is herein incorporated by reference in its entirety for all purposes.

This application is a continuation-in-part application and claims priority to U.S. Ser. No. 11/312,071 filed Dec. 20, 2005, which is and which is herein incorporated by reference in its entirety for all purposes.

U.S. Ser. No. 11/312,244 and U.S. Ser. No. 11/312,071 are continuation-in-part applications of and claim priority to U.S. Ser. No. 10/889,962 filed on Jul. 13, 2004, which is now U.S. Pat. No. 7,066,779 and which is herein incorporated by reference in its entirety for all purposes.

BACKGROUND OF THE INVENTION

Noise producing toys, which are suitable for children or pets, include a flexible body having at least a partial void space for holding air. The void space is in fluid communication with the ambient air. A noise producing structure is provided in the body, typically in the shell. As air flows from the void space to the exterior all or at least part of the air passes through the noise producing structure causing vibratory motion that produces a sound.

Various noise producing structures are known. Most commonly a commercially produced noise producing assembly is used. Any other kind of noise producing structure may also be used, such as a squeaker.

These may be easily mounted when the noise producing toy comprises a body made of vinyl as taught by U.S. Pat. No. 7,066,779, which is hereby incorporated in its entirety by reference for all purposes. Moreover, U.S. Pat. No. 7,066,779 and U.S. Patent Publication 2008/0064292 U.S. Patent Publication 2006/0121822, which are hereby incorporated in its entirety by reference for all purposes, teach mounting arrangement with respect to natural rubber.

However, mounting noise producing structure in a rubber like thermoplastics has been shown to be difficult. Thus, what is need is a mounting arrangement for mounting a noise producing structure in thermoplastic elastomers.

SUMMARY OF THE INVENTION

These and other needs are met by the present invention.

In accordance with one or more embodiments of the present invention, a method of making a noise producing toy includes the steps of:

a. providing a noise producing assembly;
b. providing or molding a first body portion comprising a first material and having an aperture, the first material comprising a material that is conducive mounting of the noise producing assembly into the aperture;
c. mounting the first body portion on a mandrel of a mold core, the mold core for forming at least part of a body of the noise producing toy;
d. molding a second body portion to engage the first body portion on a mold core to form at least part of the body,
e. separating the mandrel and mold core and the at least part toy body;
f. mounting the noise producing assembly into the aperture.

In accordance with one or more embodiments of the present invention, wherein the first material permits gluing of the noise producing assembly and the step of mounting the noise producing assembly into the aperture is performed by gluing.

In accordance with one or more embodiments of the present invention, a noise producing toy comprises:
a noise producing assembly;
a first body portion having an aperture, the first body portion comprising a material that is conducive to mounting of the noise producing assembly into the aperture;
a second body portion engaged to the first body portion to form at least part a body of the noise producing assembly;
wherein the noise producing assembly is glued into the aperture.

In accordance with one or more embodiments of the present invention, the first material comprises Styrene-Butadiene-Styrene.

In accordance with one or more embodiments of the present invention, the second body portion may comprise a second material, wherein the second material which may not be conducive to gluing the noise producing assembly, but that is capable of engaging the conducive body material. The second material may comprise Styrene-Ethylene-Butadiene-Styrene.

In accordance with one or more embodiments of the present invention, the noise producing assembly may comprise a squeaker having a reed.

In accordance with one or more embodiments of the present invention, a method of making a noise producing toy includes the steps of:

a. providing a noise producing assembly, wherein the noise producing assembly is a squeaker having a reed for vibrating to create a noise;
b. providing or molding a first body portion comprising a first material and having an aperture, the first material comprising Styrene-Butadiene-Styrene or a like thermoplastic elastomer that is conducive mounting of the noise producing assembly into the aperture;
c. mounting the first body portion on a mandrel of a mold core, the mold core for forming at least part of a body of the noise producing toy;
d. molding a second body portion to engage the first body portion on a mold core to form at least part of the body, wherein the second body portion comprises Styrene-Ethylene-Butadiene-Styrene or a like thermoplastic elastomer that is capable of engaging the conducive body material
e. separating the mandrel and mold core and the at least part toy body;
f. mounting the noise producing assembly into the aperture.

Further inventive embodiments are also presented.

BRIEF DESCRIPTION OF THE DRAWINGS

FIG. 1b is a second perspective view of the second body portion of FIG. 1a.

FIG. 12b is an exploded view of the noise producing toy of FIG. 12a.

FIG. 14b is a partially exploded perspective view of the noise producing toy of FIG. 14a.

FIG. 14c is an exploded perspective view of the noise producing toy of FIG. 14a.

FIG. 14d is a cross-sectional view through a noisemaking assembly when mounted in a body portion of the noise producing toy of FIG. 14a.

FIG. 15b is a perspective view of a first body of the noise producing toy of FIG. 15a.

FIG. 15c is a planar view of the first body portion of the noise producing toy of FIG. 15a.

FIG. 15d is a perspective view of a second body of the noise producing toy of FIG. 15a.

FIG. 15e is an elevational view of a second body portion of the noise producing toy of FIG. 15a.

FIG. 16a is a perspective view of a noise producing toy in accordance with one or more embodiments of the present invention.

FIG. 16b is a cross-sectional view of the noise producing toy of FIG. 16a wherein a noise producing element has not been mounted.

FIG. 16c is a cross-sectional view of the noise producing toy of FIG. 16a wherein the noise producing element of FIG. 16b has been mounted.

FIG. 16d is a cross-sectional view of the noise producing toy of FIG. 16a wherein the noise producing element of FIG. 16b has not been mounted.

DETAILED DESCRIPTION OF THE DRAWINGS

Figure 1A:
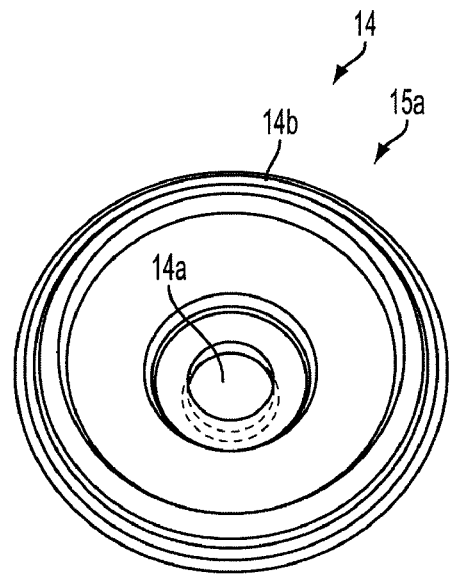
FIG. 1a is a first perspective view of a first body portion of a noise producing toy in accordance with one or more embodiments of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices.

Figure 1B:
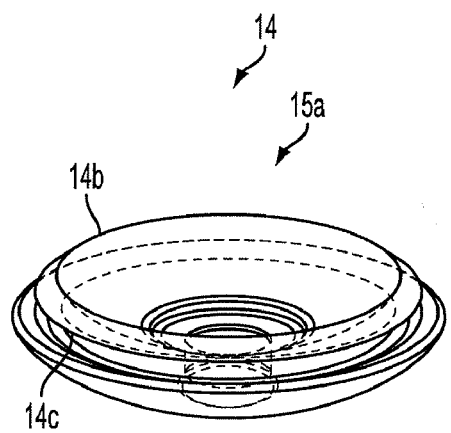
Figure 2:
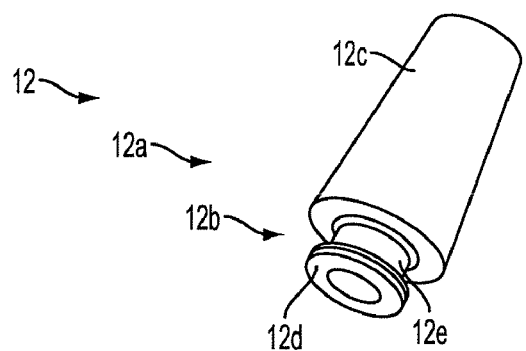
FIG. 2 is perspective view of a noise producing assembly used in a noise producing toy in accordance with one or more embodiments of the present invention.
Figure 3C:
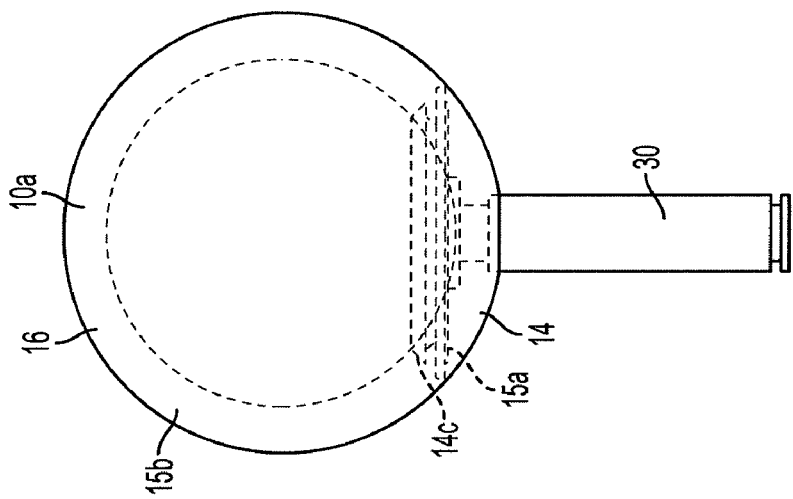
FIG. 3c is a perspective view of a step of the inventive method wherein the second body portion has been molded onto the first body portion in accordance with one or more embodiments of the present invention.
Figure 3B:
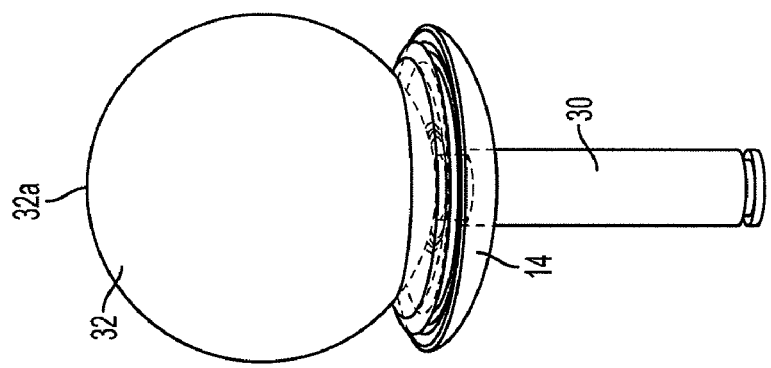
FIG. 3b is a perspective view of a step of the inventive method wherein the first body portion is mounted on the mandrel in accordance with one or more embodiments of the present invention.
Figure 3A:
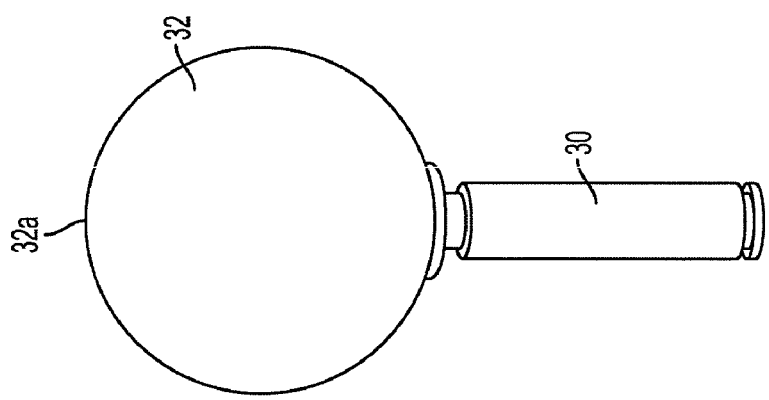
FIG. 3a is a perspective view of a mandrel and mold core used in the inventive method in accordance with one or more embodiments of the present invention.

FIG. 1a is a first perspective view of a first body portion of a noise producing toy in accordance with one or more embodiments of the present invention. FIG. 1b is a second perspective view of the second body portion of FIG. 1a. FIG. 2 is perspective view of a noise producing assembly used in a noise producing toy in accordance with one or more embodiments of the present invention. FIG. 3a is a perspective view of a mandrel and mold core used in the inventive method in accordance with one or more embodiments of the present invention. FIG. 3b is a perspective view of a step of the inventive method wherein the first body portion is mounted on the mandrel in accordance with one or more embodiments of the present invention. FIG. 3c is a perspective view of a step of the inventive method wherein the second body portion has been molded onto the first body portion in accordance with one or more embodiments of the present invention.

In accordance with one or more embodiments of the present invention, a noise producing toy 10 is suitable for children, pets, and/or any other users. Although, a ball is shown, noise producing toy 10 may be any kind object having at least a partial void space for holding air.

Noise producing toy 10 comprises a body 10a, which may be closed or partially open and defines an interior and an exterior and may have any functional, decorative, and/or desired shape. Body 10a includes a void space 10b that is in fluid communication with ambient air via a noise producing assembly 12. While void space 10b in the exemplary embodiment is defined by shell-like substantially-closed body, void space 10b may comprise any regular or irregular space between walls in the interior of a body, whether closed or partially open.

Noise producing assembly 12 may be any suitable structure that generates noise as a flow air is forced over or through it. However, noise producing assembly 12 preferably comprises a squeaker as known in the art or more particularly taught in U.S. Ser. No. 11/312,244 published as U.S. Serial No. 2006/0121822, which is herein incorporated by reference in its entirety for all purposes. In particular, such as squeaker comprises a reed that when air flows over it vibrates to create a noise.

Therein, noise producing assembly 12 includes a housing 12a that may be made of polystyrene. Housing 12a preferably comprises a grooved portion 12b, preferably in the form of a stepped shape, and a forward portion 12c that when noise producing toy 10 is assembled is in the interior of body 10a. Grooved portion 12b, in turn, comprises a rim portion 12d that when the noise producing toy 10 is assembled is substantially flush with an exterior surface of body 10a and a recess 12e for receiving a portion of the body.

Body 10a comprises at least a first body portion 14 and a second body portion 16, wherein at least one portion comprises a body material 15a that is preferably conducive to mounting of a noise producing assembly 12, e.g., a conducive body material 15a. However, noise producing toy 10 may comprise any number of body portions, of which only need comprises conducive body material. The other body material 15b, e.g., non-conducive body material, may comprise any other material, but preferably comprises a material that is capable of engaging the conducive body material, e.g., engageable body material 15b.

A body material is conducive to mounting noise producing assembly 12, when the housing of the noise producing material may be mounted by gluing, press fit, or melting of the material. If the material requires a chemical change, other than through gluing, the material is not conducive to mounting of the housing of the noise producing assembly.

Herein, conducive body material 15a may comprise Styrene-Butadiene-Styrene (SBS) that when housing 12a comprises polystyrene. Since SBS is expensive only one body portion need to be conducive. Thus, the other portions may comprise another body material 15b, engaging body material 15b, which preferably is capable of engaging conducive body material 15a.

An engaging body material 15b is capable of engaging the conducive body material when it is able to be overmolded by the injection molding process onto a pre-molded part made of the conducive body material and achieves a substantially durable, lasting bond between the conducive and engaging body materials regardless of whether a mechanical locking feature is present.

Herein, engaging body material 15b may comprise Styrene-Ethylene-Butadiene-Styrene (SEBS) which is capable of being overmolded by the injection molding process onto a pre-molded part made of SBS and achieves a substantially durable, lasting bond between the SEBS and SBS regardless of whether a mechanical locking feature is present.

Other combinations of conducive body materials 15a and engaging body materials 15b are also contemplated, and the illustrated use herein of SBS and SEBS is only by way of exemplary embodiment.

Figure 5:
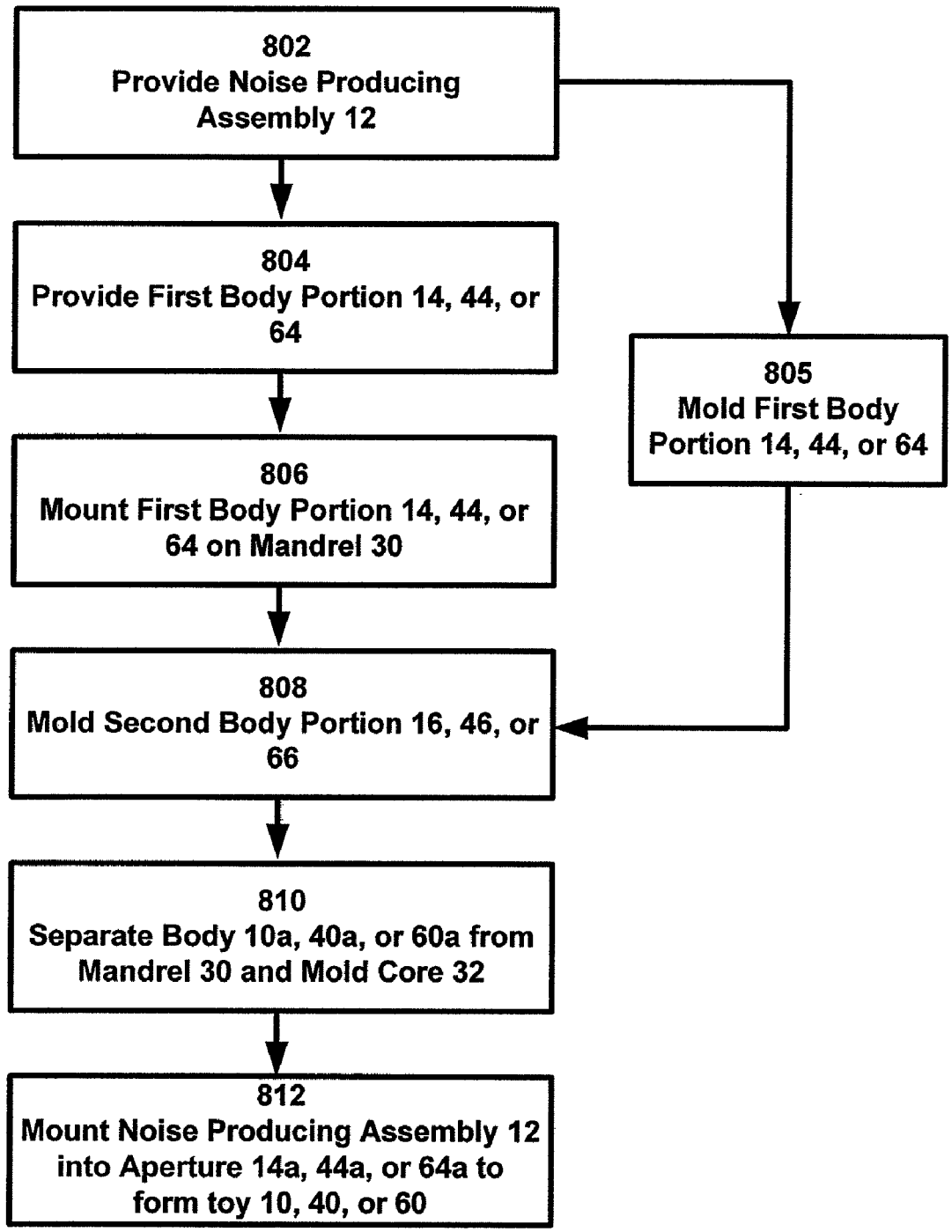
FIG. 5 is a flow diagram of the inventive method in accordance with one or more embodiments of the present invention.

FIG. 5 is a flow diagram of the inventive method in accordance with one or more embodiments of the present invention. In accordance with one or more embodiments of the present invention, a method 100 of making noise producing toy 10 includes providing the noise producing assembly 12 in a step 802. In an associated step 804, first body portion 14 may be also be provided, but preferably is pre-molded of conducive body material 15a and then provided.

First body portion 14 may have any suitable shape and includes an aperture 14a for mounting noise producing assembly 12. First body portion 14 preferably includes a peripheral edge 14b, which is sufficiently distal from aperture 14a to prevent tearing of the first body portion when a mold core is removed from the noise producing toy 10 in a subsequent step.

At least a portion of edge 14b may comprise a mechanical locking feature 14c having any suitable shape, but preferably comprising a stepped shape with an undercut that provides suitable tear resistance for locking the first body portion to another body portion.

In a step 806, first body portion 14 is mounted in an injection molding unit (not shown) on a mandrel 30, which is associated with a mold core 32, until the first body portion is in a suitable position with respect to the mold core. For example, the inside surface of the first body portion abuts the mold core as shown in FIG. 3b.

Thus, in accordance with one or more embodiments of the present invention, the first body portion has been molded on a separate mold core that includes a portion that is suitably similar or identical to the portion of mold core 32 to which the first body portion abuts.

In accordance with one or more embodiments of the present invention, first body portion 14 may instead have been molded using mold core 32 in a step 105, wherein a removable mold portion (not shown) was temporarily placed to obstruct a portion of the mold leaving only sufficient room to mold first body portion 14. Advantageously, this would not require separate steps 804 and 806, since first body portion 14 may simply remain on mandrel 30.

With first body portion 14 in a suitable position on mandrel 30, in a step 808 at least part of or substantially all of body 10a is formed. Therein, one or more second body portions 16 are molded using mold core 32. Engaging body material 15b is injection molded to form at least second body portion 16 by engaging first body portion 14 at edge 14b.

The engaging body material engages the conducive body material during the overmolding by the injection molding process onto the pre-molded portion 14 made of the conducive body material and achieves a substantially durable, lasting bond between the conducive and engaging body materials even without the mechanical locking feature.

When mechanical locking feature 14c is present, it becomes physically engaged with engaging body material 15b during over molding when material 15b forms second body portion 16.

Figure 4A:
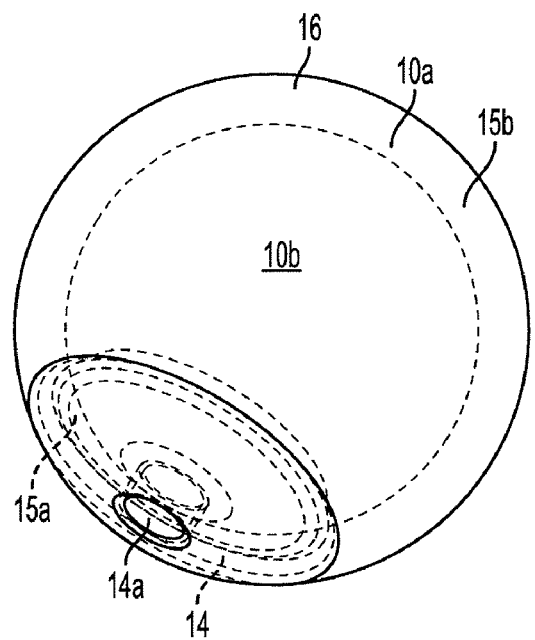
FIG. 4a is a perspective view of a step of the inventive method wherein the body of the noise producing toy has been separated from the mandrel and mold core in accordance with one or more embodiments of the present invention.

FIG. 4a is a perspective view of a step of the inventive method wherein the body of the noise producing toy has been separated from the mandrel and mold core in accordance with one or more embodiments of the present invention. In a step 810, body 10a is separated from the mold core. This may be conducted, as is generally known, in the art, by pulling the "wet," e.g., hot pliable body of noise producing toy 10 of mold core 32 via aperture 14a. As is known in the art, this may be aided by using a channel provided in mandrel 30 to conduct pressurized air into the mold core where its exits via vent 32a. The pressure expands "wet" body 10a such that it can be easily removed.

Figure 4B:
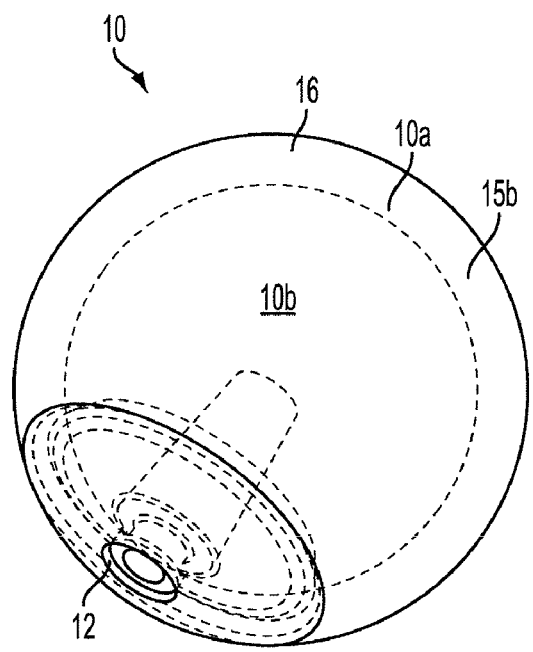
FIG. 4b is a perspective view of a step of the inventive method wherein the noise producing assembly has been mounted in the aperture of the first body portion to form a noise producing toy in accordance with one or more embodiments of the present invention.

FIG. 4b is a perspective view of a step of the inventive method wherein the noise producing assembly has been mounted in the aperture of the first body portion to form a noise producing toy in accordance with one or more embodiments of the present invention. In a step 812, noise producing assembly 12 is mounted into aperture 14a as is known in the art. However, preferably, noise producing assembly 12 is glued using any suitable glue, but in particular methylene chloride or cyanoacrylate, into aperture 12 via grooved portion 12b. Thus, rim portion 12d is flush with an exterior surface of body 10a and substantially all of the width of the shell of body 10a is received in recess 12e.

Figure 7B:
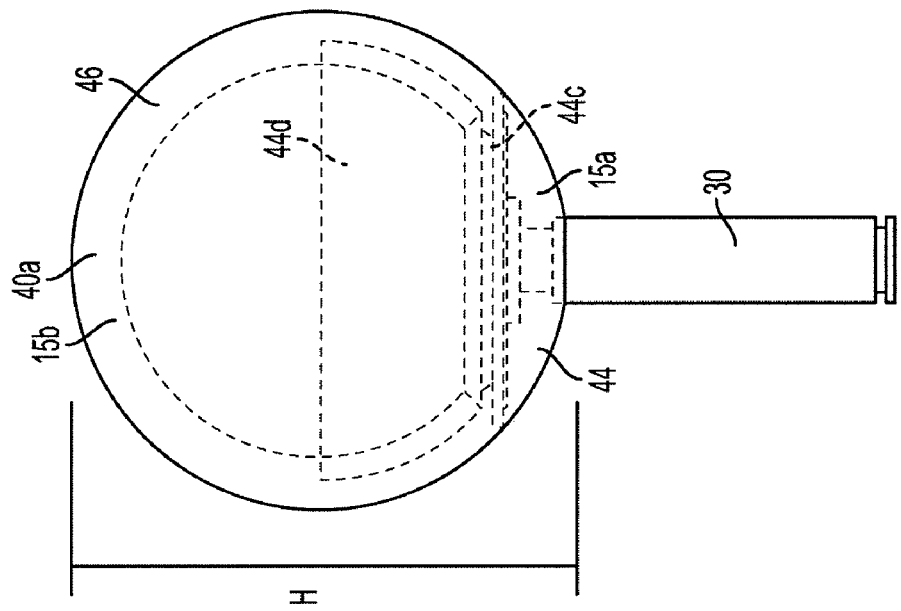
FIG. 7b is a perspective view of a step of the inventive method wherein the second body portion has been molded onto the first body portion in accordance with one or more further embodiments of the present invention.
Figure 7A:
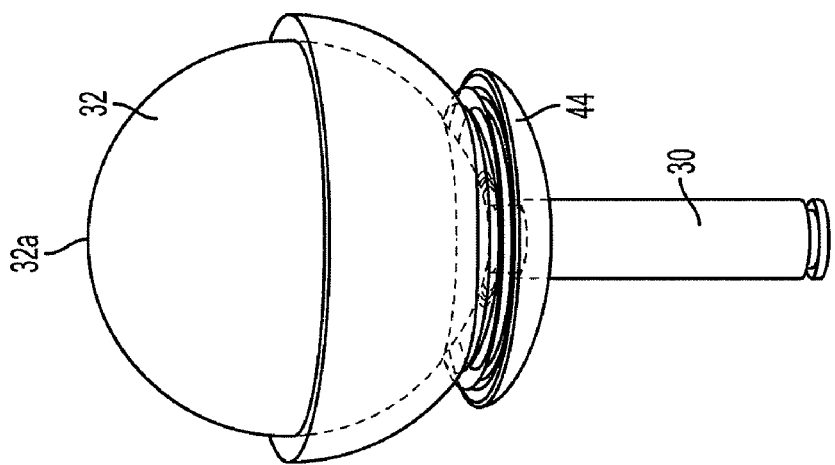
FIG. 7a is a perspective view of a step of the inventive method wherein the first body portion is mounted on a mandrel and mold core in accordance with one or more further embodiments of the present invention.
Figure 6:
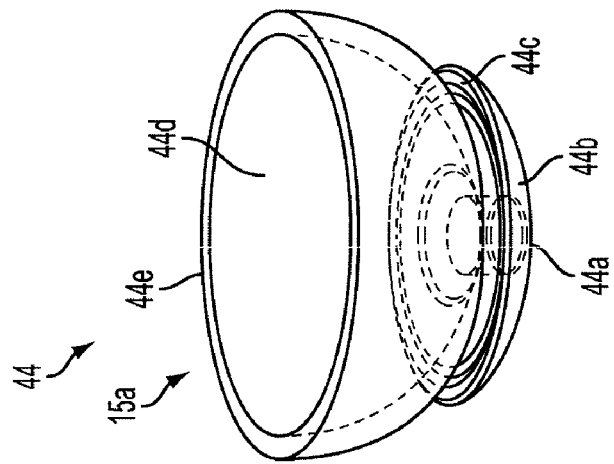
FIG. 6 is a first perspective view of a first body portion of a noise producing toy in accordance with one or more further embodiments of the present invention.
Figure 8A:
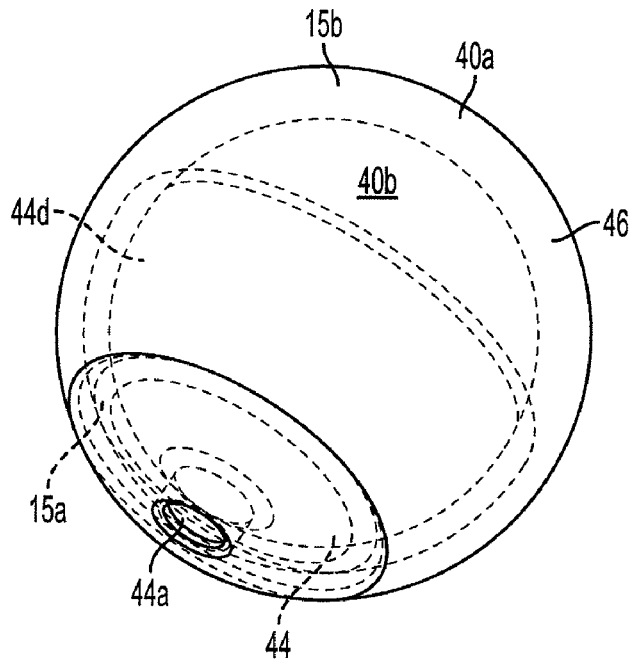
FIG. 8a is a perspective view of a step of the inventive method wherein the body of the noise producing toy has been separated from the mandrel and mold core in accordance with one or more embodiments of the present invention.
Figure 8B:
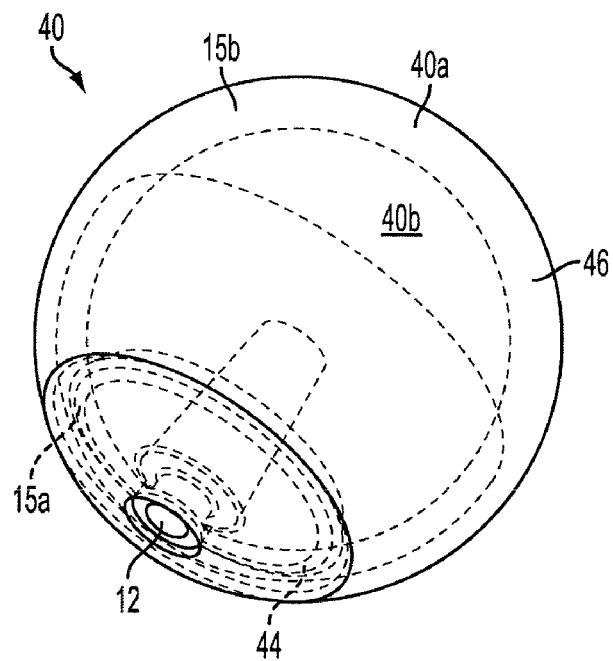
FIG. 8b is a perspective view of a step of the inventive method wherein the noise producing assembly has been mounted in the aperture of the first body portion to form a noise producing toy in accordance with one or more embodiments of the present invention.

In accordance with one or more embodiments of the present invention, the first body portion may comprise other advantageous shapes. FIG. 6 is a first perspective view of a first body portion of a noise producing toy in accordance with one or more further embodiments of the present invention. FIG. 7a is a perspective view of a step of the inventive method wherein the first body portion is mounted on a mandrel and mold core in accordance with one or more further embodiments of the present invention. FIG. 7b is a perspective view of a step of the inventive method wherein the second body portion has been molded onto the first body portion in accordance with one or more further embodiments of the present invention. FIG. 8a is a perspective view of a step of the inventive method wherein the body of the noise producing toy has been separated from the mandrel and mold core in accordance with one or more embodiments of the present invention. FIG. 8b is a perspective view of a step of the inventive method wherein the noise producing assembly has been mounted in the aperture of the first body portion to form a noise producing toy in accordance with one or more embodiments of the present invention.

Referring to FIGS. 6-8b, a noise producing toy 40 may be substantially similar to noise producing toy 10. Herein, a body 40a may be similar to body 10a except that instead of comprising a first body portion 14, body 40a comprises a first body portion 44 having a cup portion.

Noise producing toy 40 comprises a body 40a, which may be closed or partially open and defines an interior and an exterior and may have any functional, decorative, and/or desired shape. Body 40a includes a void space 40b that is in fluid communication with ambient air via noise producing assembly 12. While void space 40b in the exemplary embodiment is defined by shell-like substantially-closed body, void space 40b may comprise any regular or irregular space between walls in the interior of a body, whether closed or partially open. Therein, when the noise producing assembly 12 is assembled in body 40a, the rim portion 12d is substantially flush with an exterior surface of body 40a and recess 12e for receiving a portion of the body.

Body 40a comprises at least a first body portion 44 and a second body portion 46, wherein at least one portion comprises body material 15a that is preferably conducive to mounting of a noise producing assembly 12, e.g., conducive body material 15a. However, noise producing toy 40 may comprise any number of body portions, of which only need comprises conducive body material. The other body material 15b, e.g., non-conducive body material, may comprise any other material, but preferably comprises a material that is capable of engaging the conducive body material, e.g., engageable body material 15b.

Referring to FIG. 5, in accordance with one or more embodiments of the present invention, a method 100 of making noise producing toy 40 includes providing the noise producing assembly 12 in a step 802. In an associated step 804, first body portion 44 may be also be provided, but preferably is pre-molded of conducive body material 15a and then provided.

First body portion 44 may have any suitable shape. Similar to first body portion 14, first body portion 44 includes an aperture 44a for mounting noise producing assembly 12 and a peripheral edge 44b, which is sufficiently distal from aperture 44a to prevent tearing of the first body portion when a mold core is removed from the noise producing toy 40 in a subsequent step.

At least a portion of edge 44b may comprise a mechanical locking feature 44c having any suitable shape, but preferably comprising a stepped shape with an undercut that provides suitable tear resistance for locking the first body portion to another body portion.

However, first body portion 44 may also include a cup portion 44d comprising a substantially upright open portion having a peripheral edge 44e. Although not shown, peripheral edge 44e may have a mechanical locking feature similar to feature 14c, e.g., feature 44c.

The cup portion may extend upright to a suitable height, but preferably in range from ⅓ to ½ of a first height H of body 40 or a segment of a body 40 such that it suitably aids in overmolding the second body portion 46. Cup portion 44d comprises a wall thickness that may be any suitable thickness, but advantageously is approximately ½ of less of the overall wall thickness of body 40 in the area of the cup portion.

In a step 806, first body portion 44 is mounted in an injection molding unit (not shown) on mandrel 30, which is associated with mold core 32, until the first body portion is in a suitable position with respect to the mold core. For example, the inside surface, specifically the cup portion, of the first body portion abuts the mold core as shown in FIG. 7a.

Thus, in accordance with one or more embodiments of the present invention, the first body portion has been molded on a separate mold core that includes a portion that is suitably similar or identical to the portion of mold core 32 to which the first body portion abuts.

In accordance with one or more embodiments of the present invention, first body portion 14 may instead have been molded using mold core 32 in a step 105, wherein a removable mold portion (not shown) was temporarily placed to obstruct a portion of the mold leaving only sufficient room to mold first body portion 44. Advantageously, this would not require separate steps 804 and 806, since first body portion 44 may simply remain on mandrel 30.

With first body portion 44 in a suitable position on mandrel 30, in a step 808 at least part of or substantially all of body 40a is formed. Therein, one or more second body portions 46 are molded using mold core 32. Engaging body material 15b is injection molded to form at least second body portion 46 by engaging first body portion 44 at edge 44b as well along the outer surface of cup portion 44d and peripheral edge 44e (and any locking feature in edge 44e). This causes a greater engagement due to the greater surface area and adhesion, e.g., overmolding, than in the embodiment related to toy 10.

The engaging body material engages the conducive body material during the overmolding by the injection molding process onto the pre-molded portion 44 made of the conducive body material and achieves a substantially durable, lasting bond between the conducive and engaging body materials even without the mechanical locking feature.

When mechanical locking feature 44c and the mechanical locking feature of edge 44e are present, it becomes physically engaged with engaging body material 15b during over molding when material 15b forms second body portion 16.

FIG. 8a is a perspective view of a step of the inventive method wherein the body of the noise producing toy has been separated from the mandrel and mold core in accordance with one or more embodiments of the present invention. In a step 810, body 40a is separated from the mold core. This may be conducted, as is generally known, in the art, by pulling the "wet," e.g., hot pliable body of noise producing toy 40 of mold core 32 via aperture 44a. As is known in the art, this may be aided by using a channel provided in mandrel 30 to conduct pressurized air into the mold core where its exits via vent 32a. The pressure expands "wet" body 40a such that it can be easily removed.

FIG. 8b is a perspective view of a step of the inventive method wherein the noise producing assembly has been mounted in the aperture of the first body portion to form a noise producing toy in accordance with one or more embodiments of the present invention. In a step 812, noise producing assembly 12 is mounted into aperture 44a as is known in the art. However, preferably, noise producing assembly 12 is glued using any suitable glue, but in particular methylene chloride or cyanoacrylate, into aperture 12 via grooved portion 12b. Thus, rim portion 12d is flush with an exterior surface of body 40a and substantially all of the width of the shell of body 40a is received in recess 12e.

Figure 10B:
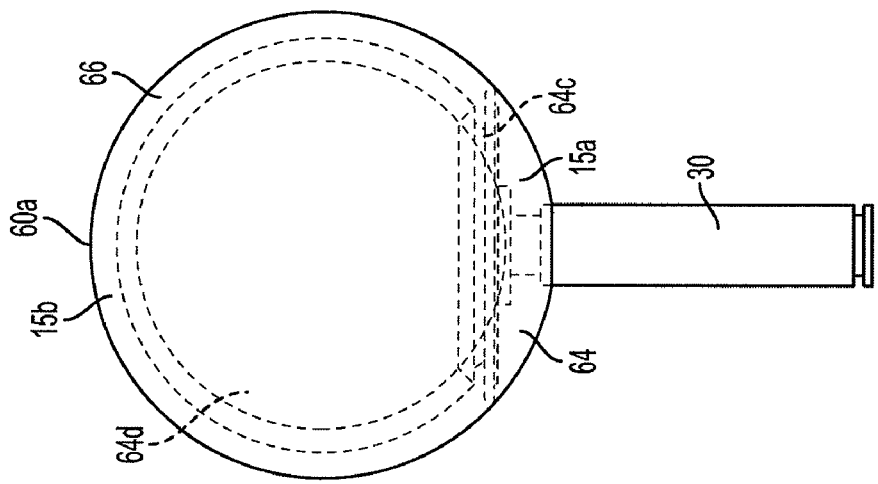
FIG. 10b is a perspective view of a step of the inventive method wherein the second body portion has been molded onto the first body portion in accordance with one or more further embodiments of the present invention.
Figure 10A:
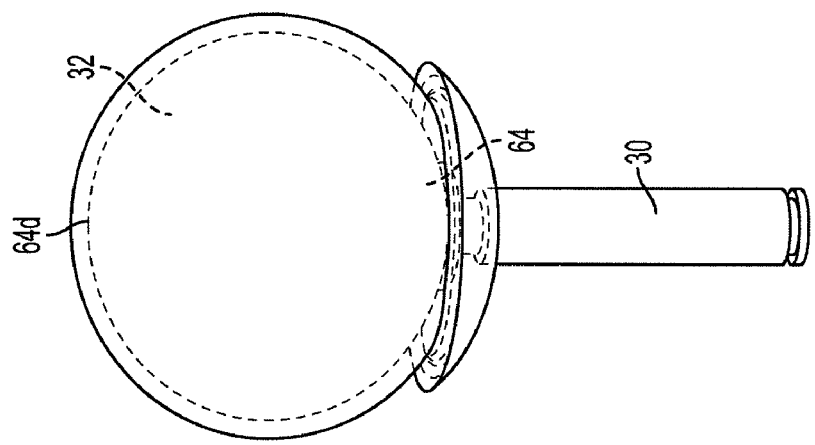
FIG. 10a is a perspective view of a step of the inventive method wherein the first body portion is mounted on a mandrel and mold core in accordance with one or more further embodiments of the present invention.
Figure 9:
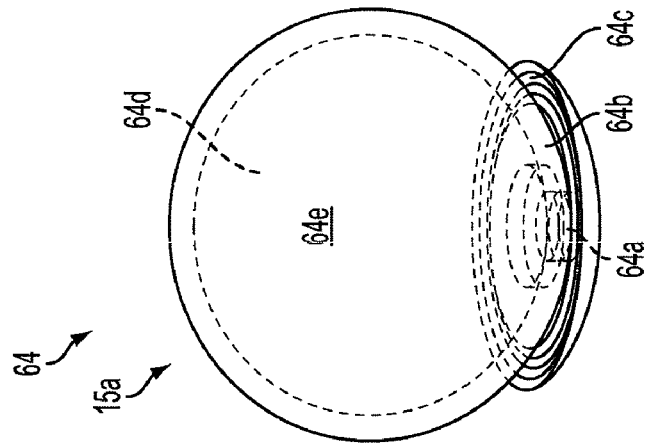
FIG. 9 is a first perspective view of a first body portion of a noise producing toy in accordance with one or more further embodiments of the present invention.
Figure 11A:
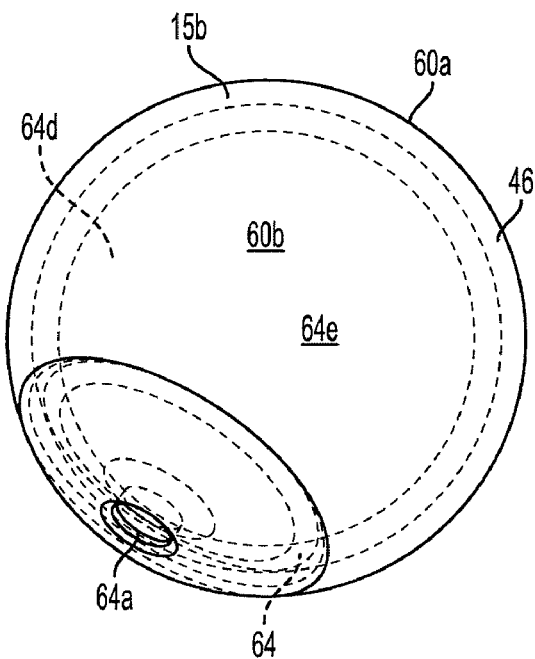
FIG. 11a is a perspective view of a step of the inventive method wherein the body of the noise producing toy has been separated from the mandrel and mold core in accordance with one or more embodiments of the present invention.
Figure 11B:
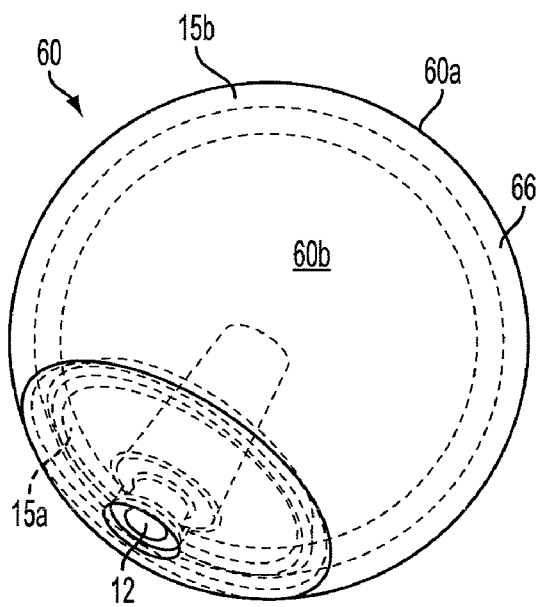
FIG. 11b is a perspective view of a step of the inventive method wherein the noise producing assembly has been mounted in the aperture of the first body portion to form a noise producing toy in accordance with one or more embodiments of the present invention.

In accordance with one or more embodiments of the present invention, the first body portion may comprise other advantageous shapes. FIG. 9 is a first perspective view of a first body portion of a noise producing toy in accordance with one or more further embodiments of the present invention. FIG. 10a is a perspective view of a step of the inventive method wherein the first body portion is mounted on a mandrel and mold core in accordance with one or more further embodiments of the present invention. FIG. 10b is a perspective view of a step of the inventive method wherein the second body portion has been molded onto the first body portion in accordance with one or more further embodiments of the present invention. FIG. 11a is a perspective view of a step of the inventive method wherein the body of the noise producing toy has been separated from the mandrel and mold core in accordance with one or more embodiments of the present invention. FIG. 11b is a perspective view of a step of the inventive method wherein the noise producing assembly has been mounted in the aperture of the first body portion to form a noise producing toy in accordance with one or more embodiments of the present invention.

Referring to FIGS. 9-11b, a noise producing toy 60 may be substantially similar to noise producing toy 10. Herein, a body 60a may be similar to body 40a except instead of comprising a first body portion 64, body 60a comprises a first body portion 44 that includes an inner body.

Noise producing toy 60 comprises a body 60a, which may be closed or partially open and defines an interior and an exterior and may have any functional, decorative, and/or desired shape. Body 60a includes a void space 60b that is in fluid communication with ambient air via noise producing assembly 12. While void space 60b in the exemplary embodiment is defined by shell-like substantially-closed body, void space 60b may comprise any regular or irregular space between walls in the interior of a body, whether closed or partially open. Therein, when the noise producing assembly 12 is assembled in body 60a, the rim portion 12d is substantially flush with an exterior surface of body 60a and recess 12e for receiving a portion of the body.

Body 60a comprises at least a first body portion 64 and a second body portion 66, wherein at least one portion comprises body material 15a that is preferably conducive to mounting of a noise producing assembly 12, e.g., conducive body material 15a. However, noise producing toy 60 may comprise any number of body portions, of which only need comprises conducive body material. The other body material 15b, e.g., non-conducive body material, may comprise any other material, but preferably comprises a material that is capable of engaging the conducive body material, e.g., engageable body material 15b.

Referring to FIG. 5, in accordance with one or more embodiments of the present invention, a method 100 of making noise producing toy 60 includes providing the noise producing assembly 12 in a step 802. In an associated step 804, first body portion 64 may be also be provided, but preferably is pre-molded of conducive body material 15a and then provided.

First body portion 64 may have any suitable shape. Similar to first body portion 14, first body portion 64 includes an aperture 64a for mounting noise producing assembly 12 and a peripheral edge 64b, which is sufficiently distal from aperture 64a to prevent tearing of the first body portion when a mold core is removed from the noise producing toy 60 in a subsequent step.

At least a portion of edge 64b may comprise a mechanical locking feature 64c having any suitable shape, but preferably comprising a stepped shape with an undercut that provides suitable tear resistance for locking the first body portion to another body portion.

However, first body portion 64 may also include a shell portion forming an inner body portion 64d having a void space 64e coincident with void space 60b. Inner body portion 64d preferably has a suitable wall thickness, which may be ⅓ to ½ of the total wall thickness of the toy 60 where measured.

In a step 806, first body portion 64 is mounted in an injection molding unit (not shown) on mandrel 30, which is associated with mold core 32 such that the inner body portion 64d cover mold core 32 as shown in FIG. 10a.

Thus, in accordance with one or more embodiments of the present invention, the first body portion has been molded on a separate mold core that is suitably similar or identical to the portion of mold core 32 to which the first body portion abuts.

In accordance with one or more embodiments of the present invention, first body portion 64 may instead have been molded using mold core 32 in a step 105 and subsequently the same mold core is used in step 806. Advantageously, this would not require separate steps 804 and 806, since first body portion 64 may simply remain on mandrel 30.

With first body portion 64 in a suitable position on mandrel 30, in a step 808 at least part of or substantially all of body 60a is formed. Therein, one or more second body portions 46 are molded using mold core 32. Engaging body material 15b is injection molded to form at least second body portion 66 by engaging first body portion 64 at edge 64b as well along the outer surface of inner body portion 64d. This causes a greater engagement due to the greater surface area and adhesion, e.g., overmolding, than in the embodiment related to toy 10 or 40.

The engaging body material engages the conducive body material during the overmolding by the injection molding process onto the pre-molded portion 64 made of the conducive body material and achieves a substantially durable, lasting bond between the conducive and engaging body materials even without the mechanical locking feature.

When mechanical locking feature 64c and the mechanical locking feature of edge 44e are present, it becomes physically engaged with engaging body material 15b during over molding when material 15b forms second body portion 16.

FIG. 11a is a perspective view of a step of the inventive method wherein the body of the noise producing toy has been separated from the mandrel and mold core in accordance with one or more embodiments of the present invention. In a step 810, body 60a is separated from the mold core. This may be conducted, as is generally known, in the art, by pulling the "wet," e.g., hot pliable body of noise producing toy 60 of mold core 32 via aperture 64a. As is known in the art, this may be aided by using a channel provided in mandrel 30 to conduct pressurized air into the mold core where its exits via vent 32a. The pressure expands "wet" body 60a such that it can be easily removed.

FIG. 11b is a perspective view of a step of the inventive method wherein the noise producing assembly has been mounted in the aperture of the first body portion to form a noise producing toy in accordance with one or more embodiments of the present invention. In a step 812, noise producing assembly 12 is mounted into aperture 64a as is known in the art. However, preferably, noise producing assembly 12 is glued using any suitable glue, but in particular methylene chloride or cyanoacrylate, into aperture 12 via grooved portion 12b. Thus, rim portion 12d is flush with an exterior surface of body 60a and substantially all of the width of the shell of body 60a is received in recess 12e.

Figure 12A:
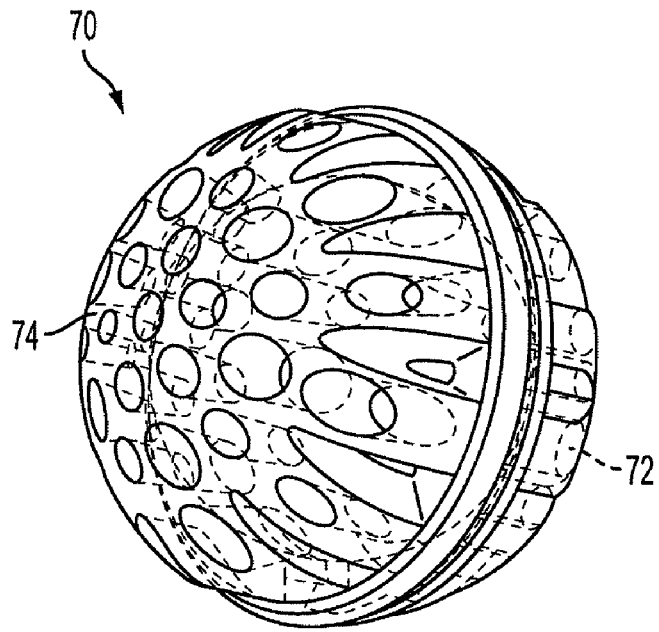
FIG. 12a is a perspective view of a noise producing toy in accordance with one or more embodiments of the present invention.
Figure 12B:
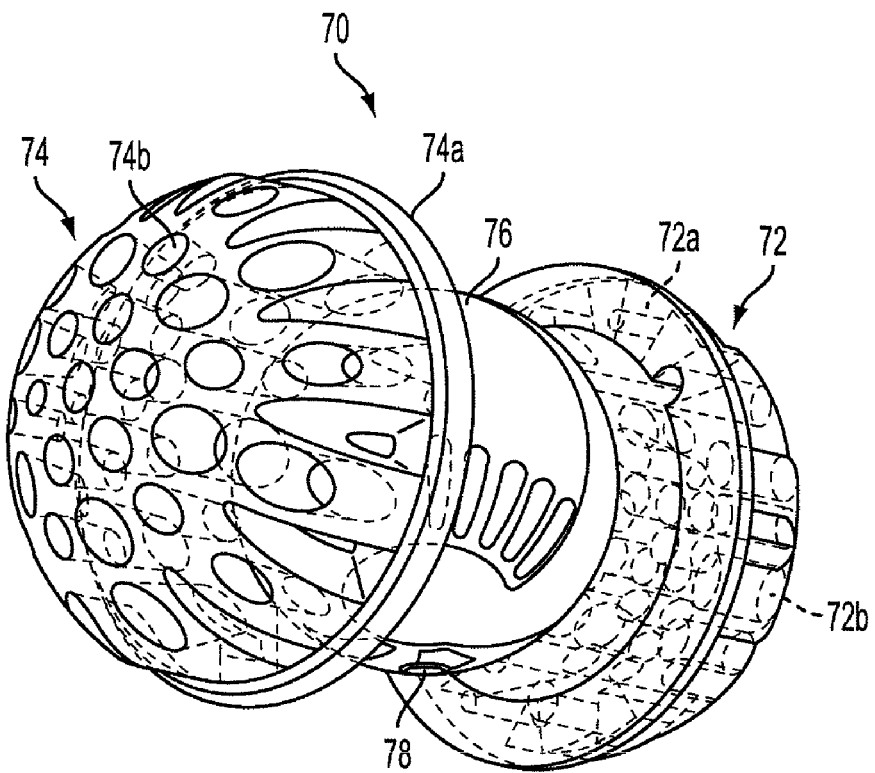

FIG. 12a is a perspective view of a noise producing toy in accordance with one or more embodiments of the present invention. FIG. 12b is an exploded view of the noise producing toy of FIG. 12a.

In accordance with one or more embodiments of the present invention, a noise producing toy 70 is suitable for children, pets, and/or any other users. Although, a ball is shown, noise producing toy 70 may be any kind of object having at least a partial void space for holding air.

Toy 70 comprises a plurality of parts, which may exceed more than the parts illustrated. Toy 70 includes a first and second part 72 and 74 that form an outer shell when joined together. Each of the parts is preferably resiliently flexible to permit an animal to play with toy 70. Toy 70 may be a three-part dog toy and includes a unique structure of making the toy and of having a unique mounting structure for mounting a squeaker recessed from a surface of the plurality of parts, e.g., parts 72 and 74.

Shell parts 72 and 74 may be molded in a natural rubber or synthetic rubber such as Styrene-Butadiene-Styrene (SBS) or Styrene-Ethylene-Butadiene-Styrene (SEBS) or a combination of an elastomeric material. The parts may be joined by gluing with adhesive, via a solvent-initiated bond, and/or via a mechanical locking feature form an inner space. To facilitate bonding, a peripheral edge 72b, 74b may be disposed on each part to adjoin a similar peripheral edge on the opposing part.

Shell parts 72 and 74 are joined together to hold an object 76. Preferably, object 76 may be a ball or any other object that fits within the inner space. Object 76 may be made as a unitary object or may comprise one or more parts that are resiliently deformable. Preferably, object 76 comprises an inner void space that is in fluid communication with the ambient air by one or more squeakers or suitable noisemaking devices 78 in order to move air through the noise making device.

Shell parts 72 and 74 may comprise a plurality of openings 72b, 74b that include at least one air passage to permit air to pass through either or all shell parts and make noise when air is moved in and/or out of object 76.

In use, air moved through noisemaking device 78 when the ball is impacted and/or chewed wherein the shell and the object are deformed to reduce the volume of the inner space.

The present construction advantageously places the squeaker in a recessed position, which hinders access to the squeaker, especially access to a squeaker that has been dislodged and may be a hazardous item for a pet when swallowed.

Figure 13:
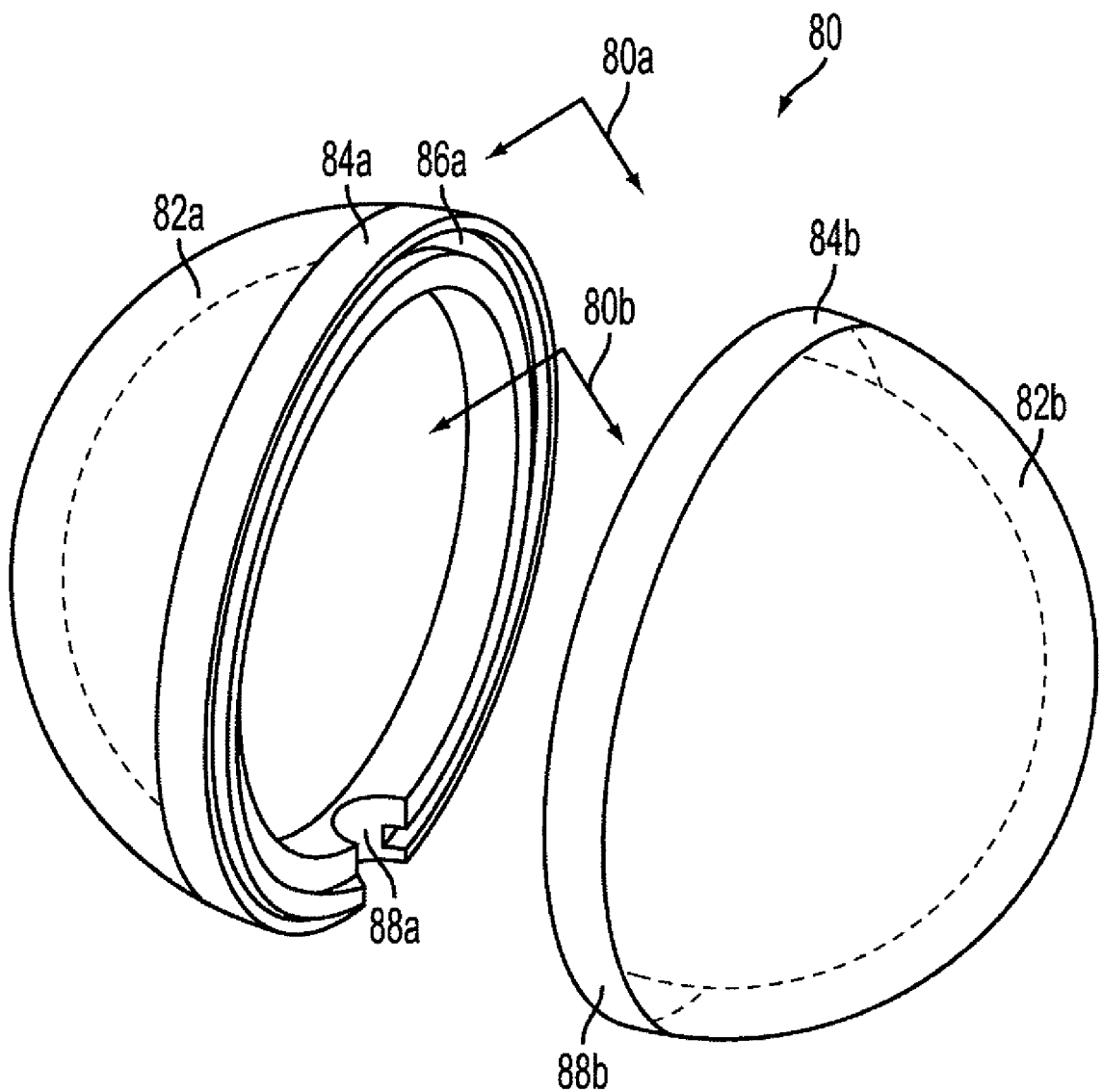
FIG. 13 is a perspective view of an exploded noise producing pet toy in accordance with one or more embodiments of the present invention.

FIG. 13 is a perspective view of an exploded noise producing toy in accordance with one or more embodiments of the present invention.

In accordance with one or more embodiments of the present invention, a noise producing toy 80 is suitable for children, pets, and/or any other users. Although, a ball is shown, noise producing toy 80 may be any kind of object having at least a partial void space for holding air.

Therein, noise producing toy 80 comprises a body having a conducive material such as Styrene-Butadiene-Styrene (SBS) and an engaging material such as Styrene-Ethylene-Butadiene-Styrene (SEBS), which is capable of being overmolded by the injection molding process onto a pre-molded part made of SBS and achieves a substantially durable, lasting bond between the SEBS and SBS regardless of whether a mechanical locking feature is present, is used.

Other combinations of conducive body materials and engaging body materials are also contemplated, and the illustrated use herein of SBS and SEBS is only by way of exemplary embodiment.

Herein, toy 80 may have any functional, decorative, and/or desired shape. Toy 80 comprises a body 80a, which may be closed or partially open and defines an interior and an exterior. Body 80a includes a void space 80b that is in fluid communication with ambient air via noise producing assembly (not shown). The noise producing assembly may be any suitable noise producing assembly, but preferably comprises a squeaker as known in the art or more particularly taught in U.S. Ser. No. 11/312,244 published as U.S. Serial No. 2006/0121822, which is herein incorporated by reference in its entirety for all purposes. In particular, such as squeaker comprises a reed that when air flows over it vibrates to create a noise.

While void space 80b in the exemplary embodiment is defined by shell-like substantially-closed body, e.g., body 80a, void space 80b may comprise any regular or irregular space between walls in the interior of a body, whether closed or partially open.

Body 80a comprises a plurality of body parts, which may exceed more than the parts illustrated. Preferably, toy 80 includes a first body portion 82a and a second body portion 82b that are molded in two halves in a traditional two-part mold. Advantageously, by using a two-part mold, it is not necessary to use an internal removable core. Since cores are removed by manual labor, avoiding cores reduces labor costs and makes toy 80 significantly more economical.

Each body portion preferably adjoins a rim section. Thus, in the exemplary embodiment, body portions 82a and 82b adjoin respective rim section 84a and 84b, which are made of a conducive body material, e.g., conducive body material 15a, to mounting a noise producing assembly 86. However, noise producing toy 80 may comprise any number of body portions, of which only the rim sections need comprise conducive body material. Body portions 82a and 82b comprise a non-conducive body material, but preferably comprises a material that is capable of engaging the conducive body material, e.g., engageable body material 15b. Thus, body portions 82a and 82b may comprise SEBS and rim sections 84a and 84b may comprise SBS.

Each rim section may include a recess portion 88a and 88b forming an aperture for receiving a noise producing assembly (not shown) such as for example the noise producing assembly 12 so that a rim portion, e.g., rim portion 12d is preferably substantially flush with an exterior surface of rim sections 84a and 84b. The noise producing assembly may be mounted by gluing, press fitting, or other means.

Advantageously, significant cost savings are possible when rim sections 84a, 84b are pre-molded and then inserted into the mold parts that make the body portions 82a, 82b prior to molding the body portions. Thus, the body portions are made of SEBS are then overmolded onto the rim sections made of SBS. Advantageously, the rim sections may comprise one or more mating parts comprising for example, a recess 86a into which a groove (not shown) mates to form one or more mechanical locking elements.

In the alternative, the rim sections may be affixed to the body portions by overmolding or press fit. Thus, the rim section may be made of an engageable body material such as material 15b, e.g., SEBS, that engages the conducive body material such as material 15a, e.g., SBS. In the alternative, the rim sections may be affixed to the body portions press fitting.

Figure 14A:
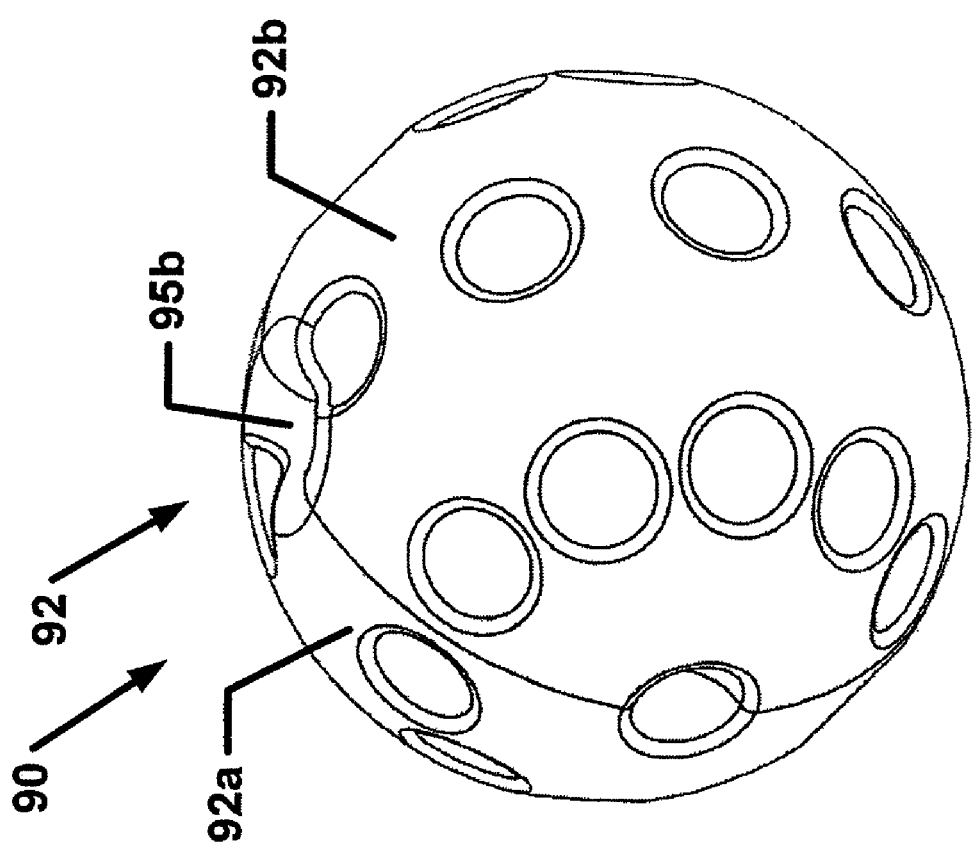
FIG. 14a is a perspective view of a noise producing toy in accordance with one or more embodiments of the present invention.
Figure 14B:
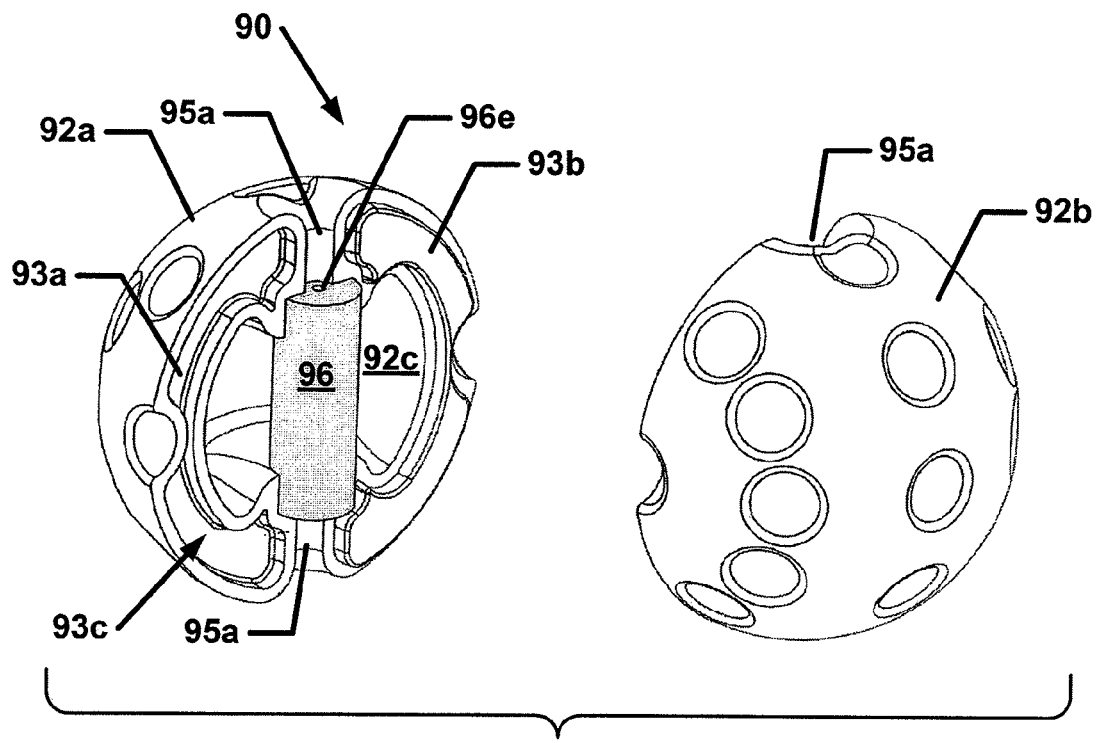
Figure 14C:
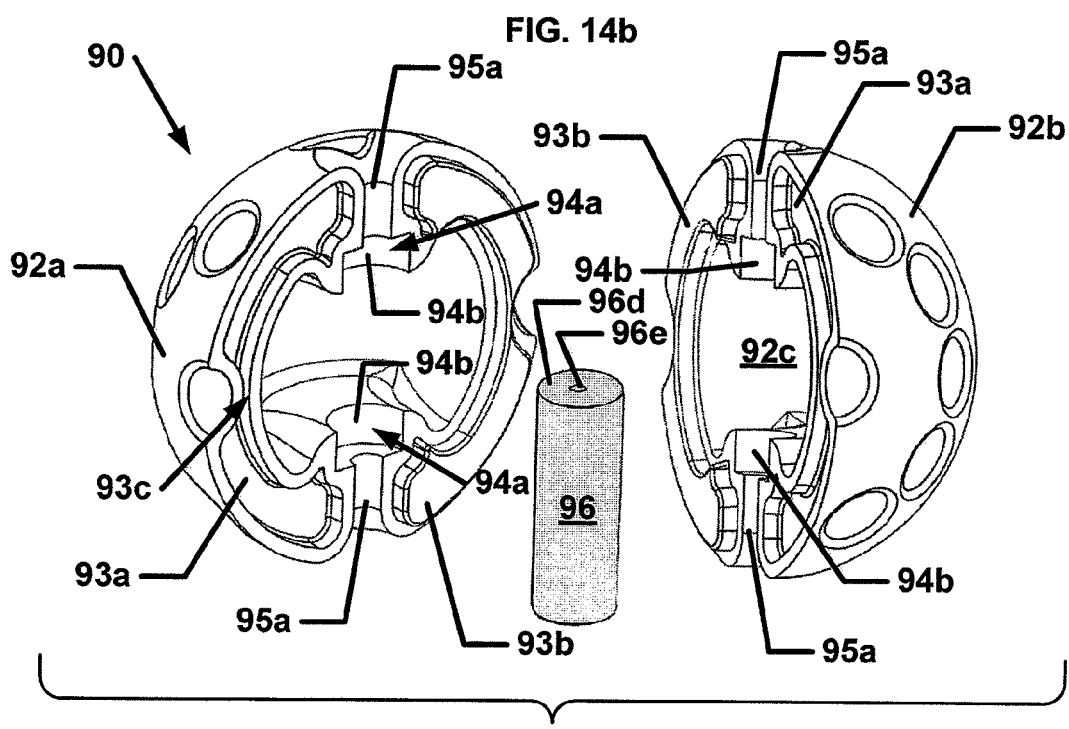
Figure 14D:
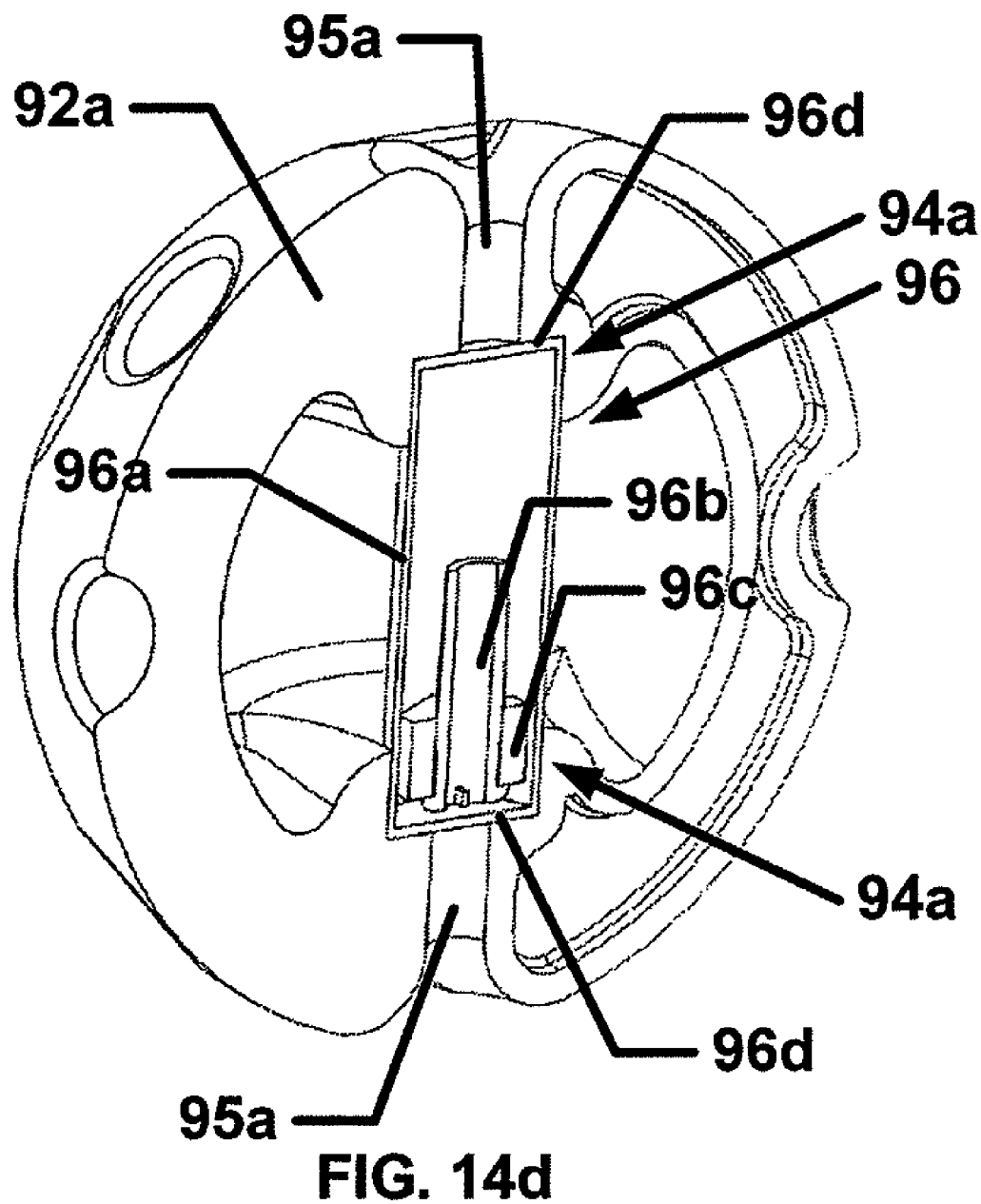

FIG. 14a is a perspective view of a noise producing toy in accordance with one or more embodiments of the present invention. FIG. 14b is a partially exploded perspective view of the noise producing toy of FIG. 14a. FIG. 14c is an exploded perspective view of the noise producing toy of FIG. 14a. FIG. 14d is a cross-sectional view through a noisemaking assembly when mounted in a body portion of the noise producing toy of FIG. 14a.

In accordance with one or more embodiments of the present invention, a noise producing toy 90 is suitable for children, pets, and/or any other users. Although, a ball is shown, noise producing toy 90 may be any kind of object that is able to retain a noise producing assembly distal from the surface of the body.

Toy 90 comprises a body 92, which may have any suitable shape and preferably comprises a plurality of body portions that are able to be joined together with and/or with the use of one or more adhesives or one or more solvents. Herein, two body portions are illustrated, but body 92 may have any suitable number of body portions.

Advantageously, the body comprises a first and a second body portion 92a and 92b that are preferably identical halves and, thus, are more cost effective to produce than two separate body portions. Each body portion includes a recess portion 93a and a corresponding protrusion 93b that mates with the recess portion of another body portion to provide a mechanical locking feature that joins the body portions together to form body 92. Although not shown in FIG. 14c as mirror images, the two body portions are intended as mirror images. Preferably, the combined recess portion and the protrusion of one body portion cover more than 90% of a mating planar surface 93c of that body portion. In this way, the body portions are suitable bonded over a large area, and when one or more adhesives or one or more solvents are used, the adhesives or solvents have a large surface area over which they can act. Therein, each body portion may be made of SBS in order to facilitate bonding or gluing. In the alternative, ultrasonic welding may also be used to join the body portions together.

Each body portion comprises one or more receiving portions 94a for receiving a noise producing assembly 96. Each receiving portion 94a is preferably disposed at one end of a channel portion 95a that extends from an outer surface of the body portion to the noise producing assembly 96 and matches a like channel portion 95a in a mating body portion to form channel 95b. Receiving portion 94a is preferably shaped to prevent lateral and longitudinal movement of the shell of the noise producing assembly relative to toy 90 by including a plurality of walls 94b that limit movement.

When assembled as noise producing toy 90, channel portions 95a form one or more channels 95b that places noise producing assembly 96 in fluid communication with the ambient air in order to vibrate and make a noise. The channels also serve to retain the noise producing assembly in an interior portion of toy 90 making it more difficult for an animal to dislodge the noise producing assembly and potentially hurting itself.

Noise producing assembly 966 may be any suitable noise producing assembly. It may comprises a squeaker as known in the art or more particularly taught in U.S. Ser. No. 11/312,244 published as U.S. Serial No. 2006/0121822, which is herein incorporated by reference in its entirety for all purposes. In particular, such as squeaker comprises a reed that when air flows over it vibrates to create a noise.

However, noise producing assembly 96 may also comprise a different structure, one wherein a squeaker moves in a shell due to a force being exerted on the shell. A shell 96a made of a durable material cross-sectional area that accommodates a squeaker 96b and a weight 96c placed around the squeaker to aid in movement of the squeaker relative to the shell. The shell permits the squeaker and weight to move along a longitudinal axis of the shell, but prevents lateral movement of the shell and weight. The shell includes end caps 96d that limit movement of the squeaker 96b and weight 96c. Each end cap includes an opening 96e that permits ambient air to reach inside the shell. As the squeaker moves in response to force, such as an impact or a change in momentum, a reed (not shown) vibrates as it passes through air and causes noise.

In a production process, body portions 92a and 92b may be made in a mold. Preferably, each body portion making up body 92 are formed to be made in any conventional mold or injection mold without the use of an internal mold core. For example, the body portions comprise a void 92c that may be formed by conventional means without an internal mold.

A production method includes the step of making at least two body portions. In a subsequent step, noise producing assembly 96 is constructed or provided. Then, the noise producing assembly is received in the receiving portions of one body portion. The second body portion is then joined to the first body portion, preferably in a manner such that the locking feature mate to create a single durable noise producing toy. Therein, it is preferred that one or more adhesives or one or more glue are applied to one or more surfaces of the mechanical locking feature, e.g., one or more recesses 93a one or more protrusions 93b.

Thus, preferably, noise producing toy 90 is advantageously made using a conventional mold without an internal core, has a noise producing assembly that is located in an interior for safety, and is produced with minimal varying parts.

Figure 15A:
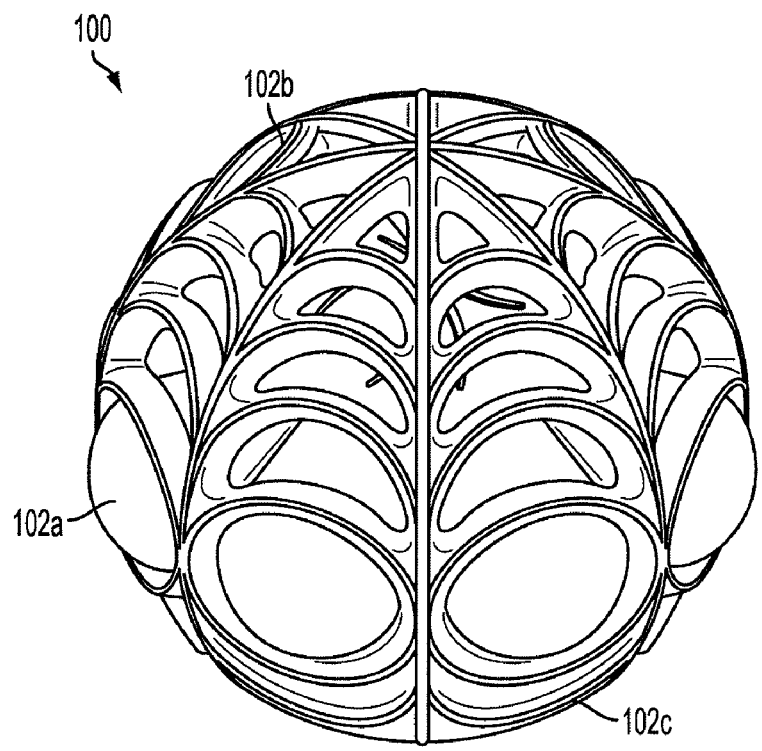
FIG. 15a is a perspective view of a noise producing toy in accordance with one or more embodiments of the present invention.
Figure 15B:
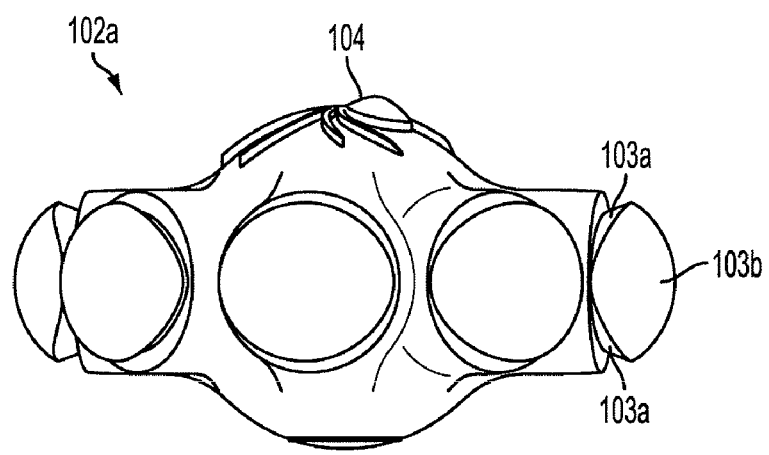
Figure 15C:
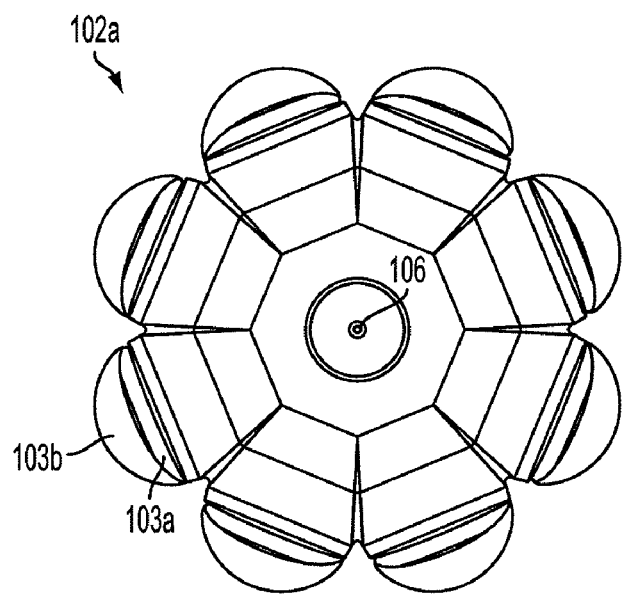
Figure 15D:
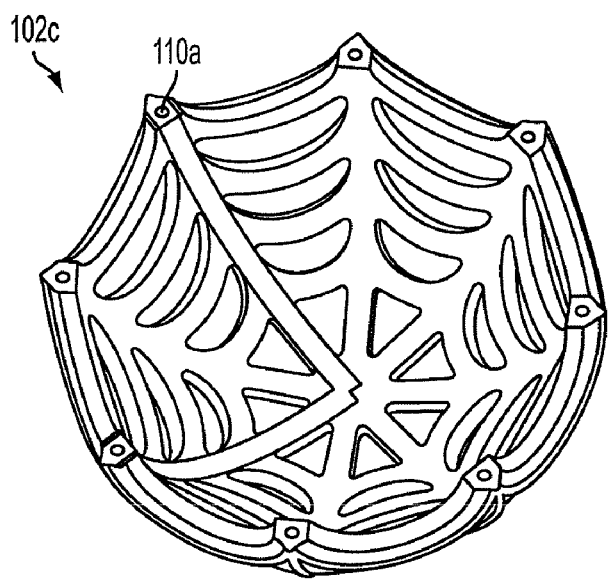

FIG. 15a is a perspective view of a noise producing toy in accordance with one or more embodiments of the present invention. FIG. 15b is a perspective view of a first body of the noise producing toy of FIG. 15a. FIG. 15c is a planar view of the first body portion of the noise producing toy of FIG. 15a. FIG. 15d is a perspective view of a second body of the noise producing toy of FIG. 15a. FIG. 15e is an elevational view of a second body portion of the noise producing toy of FIG. 15a.

In accordance with one or more embodiments of the present invention, a noise producing toy 100 is suitable for children, pets, and/or any other users. Although, a ball is shown, noise producing toy 100 may be any kind of object that is able to retain a noise producing assembly distal from the surface of the body. Although, toy 100 is shown to comprise three body parts, toy 100 may comprise more or less parts.

Therein, a noise producing toy has a first body portion 102a and one or more second body portions 102b, 102c that act as a shell to keep a noise producing assembly mounted in the first body portion distal from a pet. First body portion 102a may be made of a conducive body material, such as SBS or vinyl. The first body portion may have any suitable shape and may include one or more designs 104. The body portion includes one or more receiving areas 103a associated with protrusions 103b for receiving a portion of one or more second body portions 102b, 102c via overmolding.

Noise producing assembly 106 may be mounted in the first body portion The noise producing assembly may comprises a squeaker as known in the art or more particularly taught in U.S. Ser. No. 11/312,244 published as U.S. Serial No. 2006/0121822, which is herein incorporated by reference in its entirety for all purposes. In particular, such as squeaker comprises a reed that when air flows over it vibrates to create a noise.

The second body portions may comprise an engaging material, such as SEBS, that is overmolded onto the receiving portion along an edge 108 onto the receiving area of the first body portion. A like second body oriented as a mirror image along horizontal plane mates with the other second body to surround the first body. Both second bodies may be overmolded onto the first body and include mechanical locking features comprising recesses 110a and tabs 110b to lock a plurality of second body portions together.

FIG. 16a is a perspective view of a noise producing toy in accordance with one or more embodiments of the present invention. FIG. 16b is a cross-sectional view of the noise producing toy of FIG. 16a wherein a noise producing element has not been mounted. FIG. 16c is a cross-sectional view of the noise producing toy of FIG. 16a wherein the noise producing element of FIG. 16b has been mounted. FIG. 16d is a cross-sectional view of the noise producing toy of FIG. 16a wherein the noise producing element of FIG. 16b has not been mounted.

In accordance with one or more embodiments of the present invention, a noise producing toy 200 is suitable for children, pets, and/or any other users. Although, an elongated animal is shown, noise producing toy 120 may be any kind of object having at least a partial void space for holding air.

Noise producing toy 120 comprises a toy structure 122 having a noise assembly structure that is mounted without glue. Toy structure 122 may have any suitable structure and comprise one or more body portions, but preferably is made of a single body 122a, which may be closed or partially open and defines an interior, e.g., interior void space 122b, and an exterior and may have any functional, decorative, and/or desired shell shape. Body 122a may be made of SEBS or any other material, especially material to which it is difficult to glue another item, but that have a hot-tear resistance suitable for removing an internal molding core without damaging body 122a.

Interior void space 122b is disposed in body 122a and preferably has been formed by the use of an internal mold to reduce the amount of material used in body 122a. An opening 124 is disposed in the body and provides passage between the interior void space and the exterior. A mechanical locking feature is provided to mount a noise producing assembly 126 and may be formed as an incut, e.g., a recess 128a, in body 122a distal from the surface body 122 by a channel 130. Preferably, a length of channel 130 is selected to prevent access to the noise producing assembly to prevent ready access to an animal.

Mechanical locking feature is preferably a peripheral recess 128a or a plurality of recessed tabs. Therein, the noise producing assembly 126 may comprise a noise producing assembly, such as noise producing assembly 12 or comprises a squeaker as known in the art or more particularly taught in U.S. Ser. No. 11/312,244 published as U.S. Serial No. 2006/0121822, which is herein incorporated by reference in its entirety for all purposes. In particular, such as squeaker comprises a reed that when air flows over it vibrates to create a noise.

Moreover, the noise producing assembly 126 further includes a sleeve 126a having a mating locking feature 128b that securely mates with recess 128a to hold the noise producing assembly 126.

Figure 17:
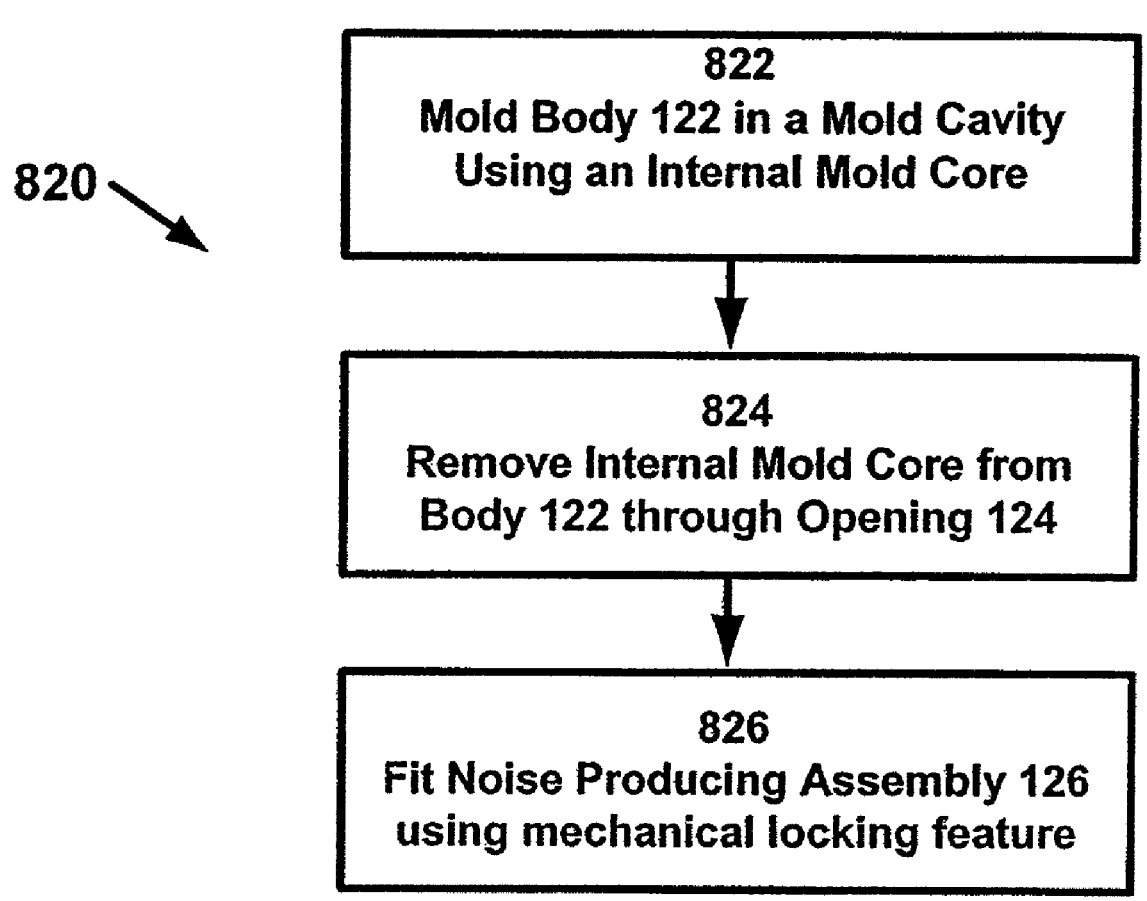
FIG. 17 is a flow diagram of the inventive method in accordance with one or more embodiments of the present invention for making noise producing toy.

FIG. 17 is a flow diagram of the inventive method in accordance with one or more embodiments of the present invention for making noise producing toy 120. In accordance with one or more embodiments of the present invention, a method 820 of making noise producing toy 120 includes a first step 822 wherein molding body 122a in a mold cavity using an internal mold core disposed on a mandrel to form a shell 122a. In a subsequent step, step 824 the internal mold core is removed from body 122a via opening 124 by temporarily increasing the inner void space in the hot pliable body using hydraulic or pneumatic pressure as is known generally in the art. The core is then removed through opening 124 using for example a method similar to step 810. In step 826, noise producing assembly 126 is then fitted, e.g., press-fitted, into the opening so that the mechanical locking features 128a and 128b retain the noise making assembly in body 122a without the need for glue.

Figure 18:
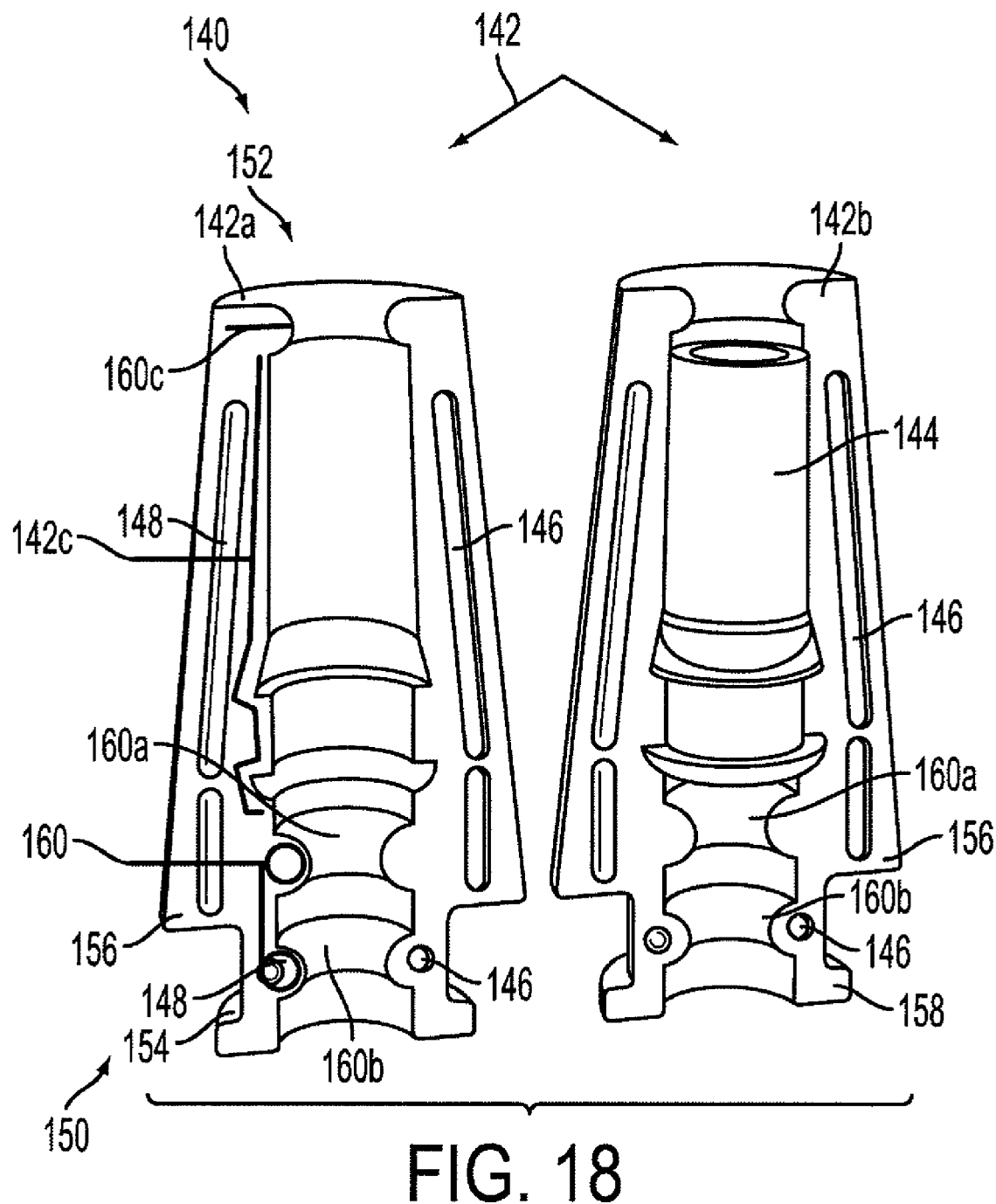
FIG. 18 is a cross-sectional view of a noise producing assembly in accordance with one or more embodiments of the present invention.

FIG. 18 is a cross-sectional view of a noise producing assembly in accordance with one or more embodiments of the present invention. Therein, a noise producing assembly 140 comprises a novel shroud for containing and protecting a squeaker mechanism for use in, e.g., a hollow toy such as a rubber ball or other play device. The noise producing assembly may be particularly well adapted to prevent an animal (e.g., a large dog with powerful jaws) from damaging the squeaker mechanism or from biting/chewing out the squeaker mechanism.

The depicted noise producing assembly 140 includes a shroud 142 that completely encases a squeaker mechanism 144. Shroud 142 and squeaker mechanism 144 may be made from any practicable material including various plastics, styrenic materials, and other materials. Shroud 142 may be assembled from two identical portion 142a, 142b that may be joined together around the squeaker mechanism 144. Thus, the shroud portions may include cavities 146 that are adapted to receive bosses 148 that serve to align the halves and strengthen the joint.

By having bosses 148 on one side of the shroud half and receiving cavities 146 on the other side of the same shroud portion, the same part may be used to manufacture both halves of the shroud 142. The two shroud portions may be joined together using any practicable chemical and/or mechanical bonding method such as methyl ethyl ketone (MEK), cyanoacrylate, other bonding agent, locking pins, snap fasteners, clips, etc., to both lock the squeaker mechanism 144 in place and to protect the squeaker mechanism 144.

Shroud 142 and squeaker mechanism 144 may be generally cylindrical. Preferably, shroud 142 may taper from a wider diameter to a narrower diameter as the shroud extends from a proximate end 150 to a distal end 152. The tapered shape may aid in inserting the noise producing assembly 140 into an opening in a toy. Proximate end 150 may also include a bonding surface 154 that is adapted to be bonded to the inside of the opening in a toy using any practicable chemical and/or mechanical bonding method such as methyl ethyl ketone (MEK), cyanoacrylate, other bonding agent, locking pins, snap fasteners, clips, etc. The diameter of the shroud 142 at the bonding surface 154 may be sized to precisely fit the opening in the toy.

Shroud 142 may also include an interior flange 156 and an exterior flange 158 at the proximate end 150 that together are adapted to hold the noise producing assembly 140 in the opening of the toy, thereby supporting the bonding method. In some embodiments, the toy may include a countersunk opening (not shown) that is adapted to receive the exterior flange 158 so that the exterior flange 158 sits flush with the outer surface of the toy. The interior flange 156 may have a diameter the size of the widest part of the shroud 142 and be substantially larger than both the exterior flange 158 and the opening in the toy. For example, the diameter of the interior flange 156 may be approximately 1.3 to 5 times larger than the opening in the toy. Other dimensions are possible. The diameter of the exterior flange 158 may be larger than the opening in the toy but smaller than the interior flange 156. This structure insures that even if the bonding method fails, the noise producing assembly 140 can only fall into the toy and cannot exit the toy. Further, even if the opening in the toy is distorted and/or enlarged enough to let the flanges slip through, the noise producing assembly 140 will tend to be more likely to fall into the toy than out of the toy due to the relative sizes of the flanges. Thus, the structure provides an inherent safety feature to the present invention that is operative to prevent an animal from working the noise producing assembly 140 out of the toy through chewing, biting, or otherwise distorting the toy. This safety feature can help prevent choking or other injuries to an animal playing with the toy, because even if the noise producing assembly 140 does become loose, it will remain trapped within the toy.

As indicated above, the squeaker mechanism 154 may be completely contained in the shroud 142. Completely encapsulating the squeaker mechanism 144 in the shroud 142 provides additionally safety features to the present invention. The entire length of the squeaker mechanism 144 may be bonded to the shroud 142 to further prevent removal of the squeaker mechanism 144 from the toy.

Shroud 142 may also include one or more internal rings 160, e.g., flanges, that both add structural stability to the noise producing assembly 140 and further secure the squeaker mechanism 144 in the shroud 142 by preventing longitudinal movement of the squeaker mechanism 144 relative to the shroud 142. Therein, at least two rings 160, e.g., flanges 160a and 160b are provided, for further protecting the squeaker from bring destroyed by an animal's tooth.

Each of the internal rings 160 includes an opening that is smaller in diameter than the diameter of the squeaker mechanism 144 at the ends of the squeaker mechanism 144. The body of the squeaker mechanism 144 may further include annular protrusions and recesses that mate with corresponding recesses and protrusions in the inner surface of the shroud 142 that also prevent longitudinal movement of the squeaker mechanism 144 relative to the shroud 142. The added structural stability of the internal rings 160 insures that the noise producing assembly 140 cannot be crushed by an animal playing with the toy or by chewing, biting, or otherwise distorting the toy. A further flange 160c is provided at the distal end to further protect the squeaker mechanism 144 from an animal's tooth piercing the toy structure. Therein, the walls of the shroud comprise a thickening 142c to further protect the squeaker mechanism from being inadvertently digested by an animal.

The noise producing assembly 140 may be used with any of the noise producing toys of the present invention.

Embodiments of the noise producing toys, noise producing assemblies, and methods of manufacture have been described here for illustration purposes only. Neither the specific embodiments of the invention as a whole, nor those of its features limit the general principles underlying the invention. In particular, the invention is not limited to any particular size or shape and may be freely mixed. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and it is not intended that the invention should be limited to any such embodiments, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A noise producing toy comprising:
   a noise producing assembly;
   a first body portion having an outer wall defining an aperture in the first body portion, the first body portion comprising a first material;
   a second body portion engaged to the first body portion to form at least part of a body of the noise producing assembly;
   wherein the noise producing assembly is spaced non-abutting from the aperture.

2. The noise producing toy of claim 1, wherein the first material comprises styrene-butadiene-styrene.

3. The noise producing toy of claim 1, wherein the second body portion comprises a second material, wherein the second material engages the first material.

4. The noise producing toy of claim 3, wherein the second material is styrene-ethylene-butadiene-styrene.

5. The noise producing toy of claim 1, wherein the first and second body portions each include a peripheral edge.

6. The noise producing toy of claim 1, wherein the first body portion comprises a cup shape.

7. The noise producing toy of claim 1, further comprising a void space in fluid communication with the ambient air.

8. The noise producing toy of claim 1, further comprising an inner body portion.

9. The noise producing toy of claim 1, wherein the noise producing assembly comprises a squeaker.

10. The noise producing toy of claim 9, further comprising an interlocking mechanical feature for connecting the first body portion to another body portion.

11. The noise producing toy of claim 1, further comprising an interlocking mechanical feature for connecting the first body portion to another body portion.

12. The noise producing toy of claim 1, wherein the first material is conducive to mounting of the noise producing assembly.

13. A noise producing toy comprising:
   a noise producing assembly;
   a first body portion having an aperture, the first body portion comprising a material that is conducive to mounting of the noise producing assembly into the aperture;
   a second body portion engaged to the first body portion to form at least part of a body of the noise producing assembly;
   wherein the noise producing assembly is glued into the aperture.

14. The noise producing toy of claim 13, wherein the noise producing assembly comprises a squeaker.

15. A noise producing toy comprising:
   a noise producing assembly;
   a first body portion having an aperture defined by an outer wall of the first body portion and a channel portion;
   a second body portion joined to the first body portion;
   the noise producing assembly mounted in a channel portion;
   wherein the noise producing assembly is spaced non-abutting from the aperture.

16. The noise producing toy of claim 15, wherein the first body portion and the second body portion comprise different materials.

17. The noise producing toy of claim 15, wherein the noise producing assembly consists of a squeaker.

18. The noise producing toy of claim 15, further comprising an inner body portion.

19. A noise producing toy comprising:
   a noise producing assembly;
   a first body portion having an aperture;
   a second body portion joined to the first body portion;
   the noise producing assembly mounted in the aperture;
   wherein the noise producing assembly is recessed from an outer surface of the first body portion,
   wherein the second body portion is joined to a peripheral edge of the first body portion.

20. The noise producing toy of claim 19, wherein the first body portion and the second body portion comprise different materials.

21. A noise producing toy comprising:
   a noise producing assembly;
   a first body portion having an aperture;
   a second body portion joined to the first body portion;
   the noise producing assembly mounted in the aperture;
   an interlocking mechanical feature for connecting the first body portion to another body portion
   wherein the noise producing assembly is recessed from an outer surface of the first body portion.

22. The noise producing toy of claim 21, wherein the noise producing assembly consists of a squeaker.

23. A noise producing toy comprising:
   a body comprising a first body portion, a second body portion, and an aperture defined by an outer wall of the body;
   a squeaker for making a noise when air passes through the squeaker and exits the aperture, the squeaker being disposed in the body spaced non-abutting from the aperture in the outer wall of the body;
   an interlocking mechanical feature for connecting the first and second body portion.

* * * * *